(12) United States Patent
Wang et al.

(10) Patent No.: US 10,090,880 B2
(45) Date of Patent: Oct. 2, 2018

(54) NARROW BAND PRACH WITH MULTIPLE TONE HOPPING DISTANCES

(71) Applicant: QUALCOMM Incorporated, San Diego, CA (US)

(72) Inventors: Renqiu Wang, San Diego, CA (US); Hao Xu, San Diego, CA (US); Xiao Feng Wang, San Diego, CA (US); Wanshi Chen, San Diego, CA (US); Peter Gaal, San Diego, CA (US); Juan Montojo, San Diego, CA (US); Alberto Rico Alvarino, San Diego, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/279,991

(22) Filed: Sep. 29, 2016

(65) Prior Publication Data

US 2017/0180001 A1 Jun. 22, 2017

Related U.S. Application Data

(60) Provisional application No. 62/269,799, filed on Dec. 18, 2015.

(51) Int. Cl.
*H04L 5/00* (2006.01)
*H04B 1/7143* (2011.01)
(Continued)

(52) U.S. Cl.
CPC ......... *H04B 1/7143* (2013.01); *H04L 5/0007* (2013.01); *H04L 5/0012* (2013.01);
(Continued)

(58) Field of Classification Search
CPC . H04W 74/002; H04W 74/0833; H04W 4/70; H04B 1/7143; H04L 27/2613; H04L 5/0053; H04L 5/0012; H04L 5/0007
See application file for complete search history.

(56) References Cited

U.S. PATENT DOCUMENTS 5,907,597 A * 5/1999 Mark .................. G06Q 20/341
340/5.84
8,811,371 B2 * 8/2014 Gaal ..................... H04B 7/068
370/208
(Continued)

FOREIGN PATENT DOCUMENTS

WO 2015102281 A1 7/2015

OTHER PUBLICATIONS

International Search Report and Written Opinion—PCT/US2016/061483—ISA/EPO—dated Mar. 2, 2017.
(Continued)

*Primary Examiner* — Jean B Corrielus
(74) *Attorney, Agent, or Firm* — Nerrie M. Zohn

(57) ABSTRACT

Due to the limited dimension of a NB that may be used by multiple users, as well as possible large coverage areas, timing offset estimation may be outside of NCP. The inaccuracy in the timing estimate can be improved by using more than one tone hopping distance for PRACH. An apparatus may then transmit a first and second tone of the PRACH at a first hopping distance from the first tone. The apparatus may then transmit a third tone of the PRACH and a fourth tone of the PRACH at a second hopping distance from the third tone. The second hopping distance may be greater than first hopping distance. The apparatus may also transmit an additional tone of the PRACH using a random hopping distance. A receiving apparatus may receive the transmitted
(Continued)

PRACH and determine a phase estimation based on the sets of tones having different hopping distances.

40 Claims, 16 Drawing Sheets

(51) Int. Cl.
 H04W 74/08 (2009.01)
 H04W 74/00 (2009.01)
 H04L 27/26 (2006.01)
 H04W 4/70 (2018.01)

(52) U.S. Cl.
 CPC ........ *H04L 5/0053* (2013.01); *H04L 27/2613* (2013.01); *H04W 4/70* (2018.02); *H04W 74/002* (2013.01); *H04W 74/0833* (2013.01)

(56) References Cited

U.S. PATENT DOCUMENTS

| | | | | |
|---|---|---|---|---|
| 9,661,663 | B1* | 5/2017 | Lin | H04W 74/085 |
| 2014/0198742 | A1 | 7/2014 | Baldemair et al. | |
| 2016/0105908 | A1* | 4/2016 | Li | H04W 4/005 |
| | | | | 370/329 |
| 2016/0105910 | A1* | 4/2016 | Wang | H04W 74/0833 |
| | | | | 370/329 |
| 2017/0134199 | A1* | 5/2017 | Wang | H04L 27/2602 |

OTHER PUBLICATIONS

LG Electronics., "Discussion on Random Access Procedure for NB-IoT", 3GPP Draft, R1-156885, Discussion on Random Access Procedure for NB-IOT, 3rd Generation Partnership Project (3gpp), Mobile Competence Centre, 650, Route Des Lucioles, F-06921, Sophia-Antipolis Cedex, vol. RAN WG1, No. Anaheim, California, USA, Nov. 15, 2015-Nov. 22, 2015, Nov. 15, 2015, XP051003239, 4 pages. Retrieved from the Internet: URL:http:jjwww.3gpp.orgjftp/Meetings_3GPP_SYNC/RAN1/Docs/.

Qualcomm Incorporated., "Random access design", 3GPP Draft, R1-157497, Random Access Design, 3rd Generation Partnership Project (3gpp), Mobile Competence Centre, 650, Route Des Lucioles, F-06921, Sophia-Anti Polis Cedex, France, vol. RAN WG1, No. Anaheim, USA, Nov. 15, 2015-Nov. 22, 2015, Nov. 16, 2015 (Nov. 16, 2015), XP051003611, 3 pages. Retrieved from the Internet: URL:http:ffwww.3gpp.org/ftp/Meetings_3GPP_SYNC/RANI/Docs/.

Samsung., "Narrowband IOT—Uplink Design", 3GPP Draft, R1-155514, Narrowband IoT—Uplink Design, 3rd Generation Partnership Project (3gpp), Mobile Competence Centre, 650, Route Des Lucioles, F-06921, Sophia-Antipolis Cedex, France, vol. RAN WG1, No. Malmo, Sweden, Oct. 5, 2015-Oct. 9, 2015, Oct. 4, 2015, XP051002405, 5 pages. Retrieved from the Internet: URL:http://www.3gpp.org/ftp/Meetings 3GPPSYNC/RANI/Docs/.

\* cited by examiner

NARROW BAND PRACH WITH MULTIPLE TONE HOPPING DISTANCES

CROSS-REFERENCE TO RELATED APPLICATION

This application claims the benefit of U.S. Provisional Application Ser. No. 62/269,799, entitled "Narrow Band PRACH with Tone Hopping Distance Based on CE Level" and filed on Dec. 18, 2015, which is expressly incorporated by reference herein in its entirety.

BACKGROUND

Field

The present disclosure relates generally to communication systems, and more particularly, to a Physical Random Access Channel (PRACH) in Narrow Band (NB) wireless communication.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

Narrow Band (NB) wireless communication, such as NB Internet of Things (NB-IOT), faces numerous challenges. It has a limited frequency dimension that may be shared by multiple users. For example, NB-IOT may occupy a single Resource Block (RB), which presents unique challenges for a NB PRACH. Large coverage areas, may result in for NB-IOT timing offsets that extend beyond the range for which the Normal Cyclic Prefix (NCP) can compensate. Furthermore, devices may face different environments based on device placements and installation locations.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Since NB-IOT devices are envisioned to operate in different communication environments, it becomes convenient to categorize devices based on coverage enhancement (CE) levels that correspond to the devices' different environmental conditions. Due to the limited dimension of a NB that may be used by multiple users, as well as possible large coverage areas, timing offset estimation may be outside of NCP. The inaccuracy in the timing estimate can be improved by using more than one tone hopping distance for PRACH.

Multiple aspects are presented herein for improving the accuracy of the timing estimation, e.g., by using multiple tone hopping distances between tones of a PRACH.

In an aspect of the disclosure, a method, a computer-readable medium, and an apparatus are provided. An apparatus transmits a first and second tone of the PRACH at a first hopping distance from the first tone. The apparatus then transmits a third tone of the PRACH and a fourth tone of the PRACH. The third tone may be at a second hopping distance from the second tone or the fourth tone may be at a second hopping distance from the third tone. The second hopping distance may be greater than first hopping distance. The apparatus may also transmit an additional tone of the PRACH using a random hopping distance.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
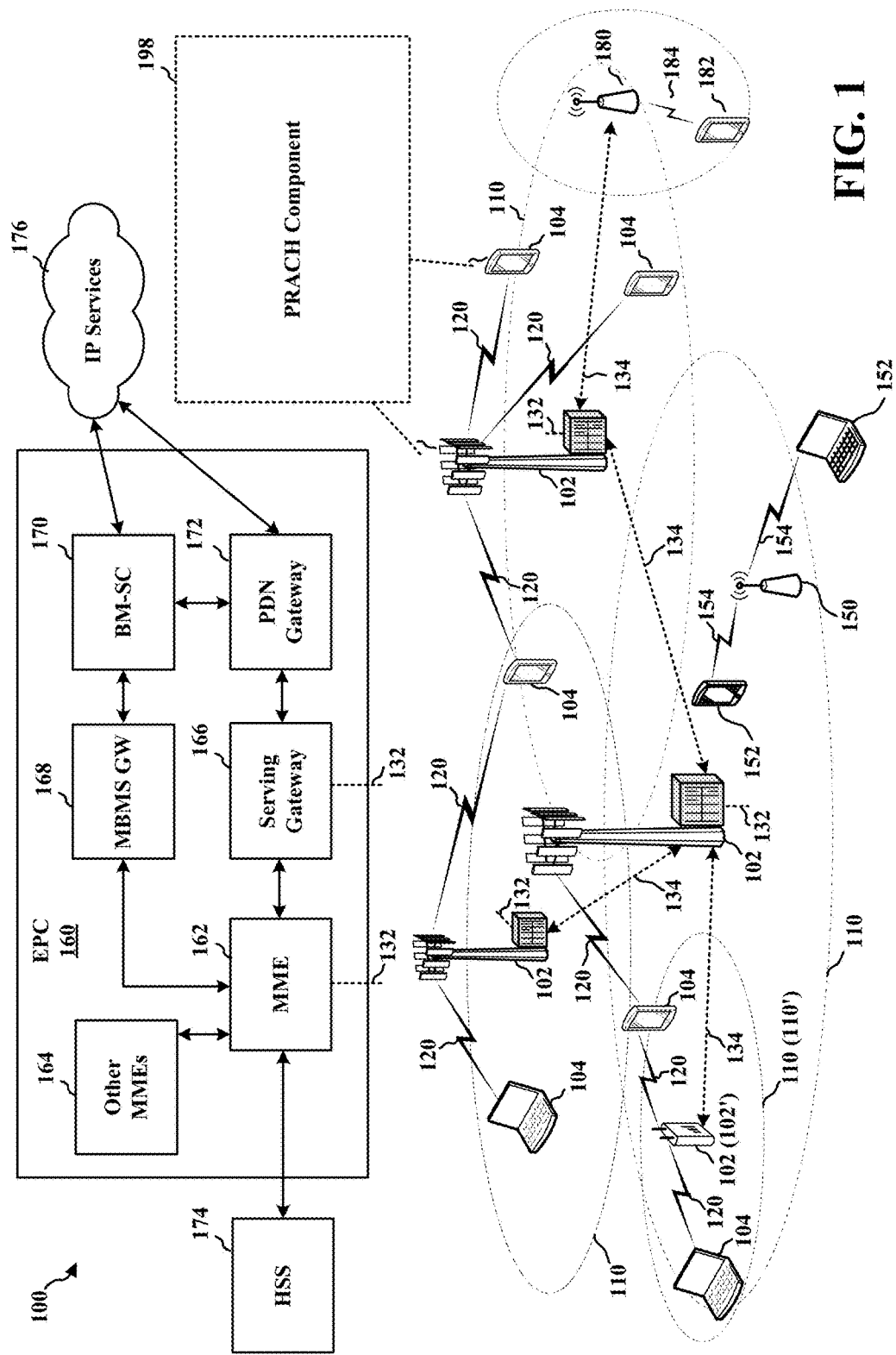
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104/eNB 102 may comprise a PRACH component 198. In the UE 104, the PRACH component 198 may be configured to transmit tones of a PRACH using multiple hopping distances, e.g., including a first distances, a second distance longer than the first distances, and and/or a random hopping distance. PRACH component 198 may comprise, e.g., components 1208, 1210 in FIG. 12. An eNB 102 may similarly comprise a PRACH component 198 configured to receive tones of a PRACH from a UE having multiple hopping distances, e.g., including a first distances, a second distance longer than the first distances, and a/or a random hopping distance. The PRACH component 198 at the eNB may determine a phase estimation based on the sets of tones having different hopping distances.

Figure 2:
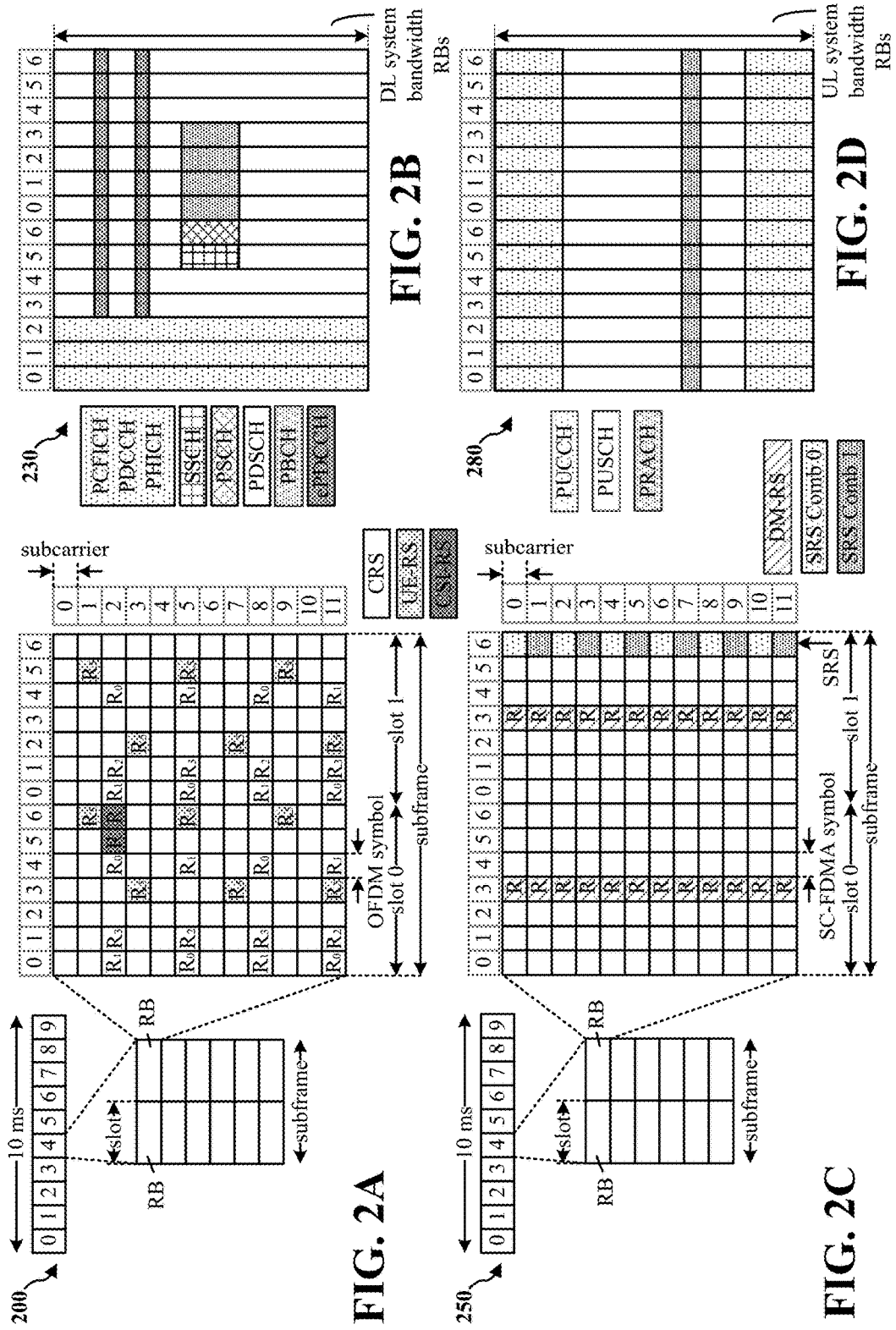
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as R0, R1, R2, and R3, respectively), UE-RS for antenna port 5 (indicated as R5), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
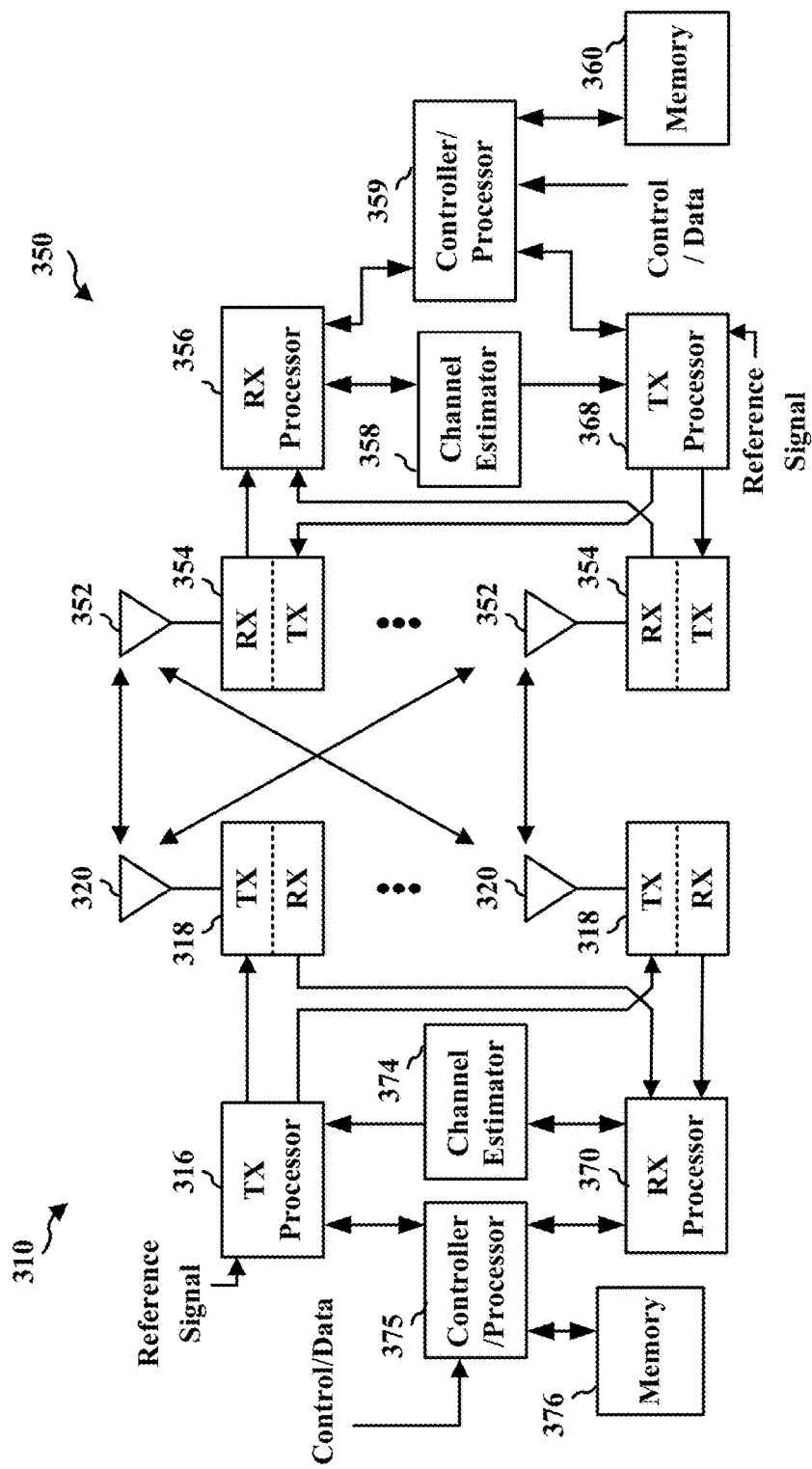
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

NB wireless communication involves unique challenges due to the limited frequency dimension of the narrow band. For example, NB IOT may be limited to a single resource block of system bandwidth, e.g., 200 Hz. This narrow band communication may be deployed "in-band," utilizing resource blocks within a normal LTE carrier, or in the unused resource blocks within a LTE carrier's guard-band, or "standalone" for deployments in dedicated spectrum. Multiple users, e.g., UEs may utilize the narrow band. While only some of the UEs may be active at a particular time, the NB communication should support such multi-user capacity.

Additionally, NB may need to provide for deep coverage, by accounting for devices in environments requiring different Coverage Enhancement (CE) levels. For example, some device may need as much as 20 dB of CE, which results in greater uplink TTI bundling, further limiting time resources.

NB-IOT communication may also involve a large cell radius, e.g., as much as approximately 35 km. Thus, the communication may involve a long delay, such as 200 μs, which may involve a long Cyclic Prefix (CP) length.

In order to be effective, the NB communication should provide a false alarm rate below 1% and a miss detection rate below approximately 1%.

A transmitter may need to estimate a timing offset estimate between the transmitter and the corresponding receiver. Therefore, it may be preferable for such a timing offset to be within a Normal Cyclic Prefix (NCP), e.g., <approximately 4.7 μs.

It may be beneficial for narrow band communication to comprise Time Division Duplex (TDD) which provides a mode of bidirectional communication in which transmissions in each direction may take place on the same carrier in different time slots. For example, consecutive UL subframes may be limited by TBB configurations, e.g., 1 ms, 2 ms, 3 ms.

A PRACH for the narrow band communication may comprise a single tone UE as a baseline. The PRACH may be configured so that a residue frequency error between the transmitter and the receiver, e.g., between the UE and eNB, is within +/−50 Hz. A single tone PRACH design may include fixed hopping distances and/or random hopping distances. There may be at least two sources of error for communication between the transmitter and the receiver. First, the communication may involve a frequency error, and second, the communication may involve a timing offset.

A PRACH may include at least four symbols. Two symbols of the PRACH may be transmitted at the same tones for frequency error estimation. Two symbols may be at different tones for timing estimations after frequency offset compensation. When the two symbols are sent at different tones, the timing offset will remain as a phase difference. This phase difference can be extracted in order to identify the timing offset. Additional sets of symbols may be used for the PRACH, four symbols is merely one example.

Figure 4:
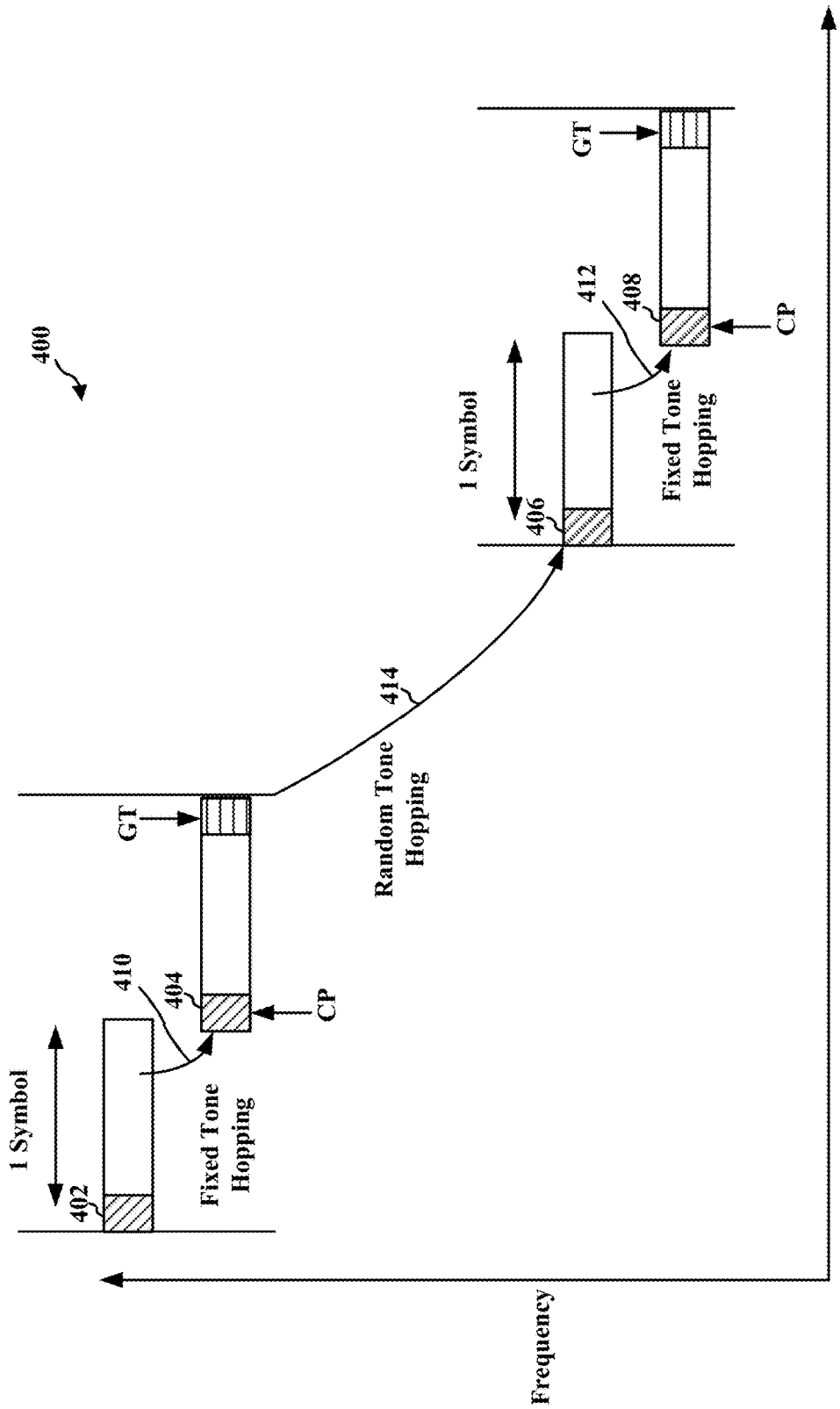
FIG. 4 illustrates fixed and random tone hopping in a PRACH in accordance with aspects presented herein.

FIG. 4 illustrates an example NB PRACH 400 comprising four tones 402, 404, 406, 408 involving both fixed and random tone hopping distances between the tones. Each of the tones 402, 404, 406, 408 occupies only a single resource block of system bandwidth. Furthermore, PRACH tone spacing may be smaller than normal data transmissions. Therefore, there may be more tones in one RB bandwidth.

In normal LTE data transmission 1RB=12 tones based on normal tone spacing of 15 KHz. For PRACH, the tone spacing may be smaller. For example, in LTE, PRACH tone spacing may be 15 khz/12 resulting in 12*12=144 tones. In a narrow band example, such as NB-IOT PRACH, the tone spacing may instead be 15 khz/16 so total a 16*12 tones may be within 1 RB. This is only one example of a smaller NB PRACH spacing, and there may be other such spacings that are smaller than a normal LTE data transmission.

A first tone 402 and a second tone 404 of the PRACH are separated by a fixed tone hopping distance 410. Similarly, the third symbol 406 and the fourth symbol 408 may be separated by the a second fixed tone hopping distance 412. The second tone 404 and the third tone 406 may be separated by a random hopping distance 414. For example, if the fixed tone hopping distance 410 is 5, and the first tone 402 is at tone position 0, the second tone 404 will be at tone position 5. The third tone 406 is not necessarily at tone position 10. Instead, the third tone 406, may be at Tone 7 or tone position 2, e.g., a random distance from the second tone 404 of the PRACH. The fourth tone 408, will then follow at the fixed distance 412 from the third tone 406. The fixed distance 412 may be the same as fixed distance 410, e.g., 5. In this example, if the third tone is at tone position 2, the fourth tone 408 will be at tone position 7. If instead, the third tone is at tone position 7, the fourth tone will be at tone position 12. However, fixed distance 412 may be a different than fixed distance 410.

As indicated narrow band communication may deployed "in-band," utilizing resource blocks within a normal LTE carrier. This may cause interference to wide band LTE, the interference being more severe at a high SNR. There may also be a loss of signals and increased inter-symbol interference (ISI).

It can be important to maintain a timing error of the timing offset estimation within a certain range. A NB transmitter may improve the accuracy of the timing estimation by transmitting the PRACH using multiple fixed hopping distances.

The timing accuracy of the PRACH may be affected by the tone hop distance used for the PRACH. The distance between tones provides scaling that may be used in determining the timing offset. The accuracy of the timing estimation increases with the tone hop distance used for the PRACH. However, it may be problematic to increase the tone hop distance, e.g., for UEs that are distant from the eNB, because they experience a larger delay. Therefore, different PRACH tone hop distances may be used in order to improve the timing estimation and to meet the needs of UEs in deep coverage.

Low CE levels may benefit from larger tone hopping spacing. UEs having a low CE level may have, e.g., a better RSRP result and a higher SNR, and therefore experience a smaller delay. By increasing the tone hopping distance, the accuracy of the timing estimation is improved for such UEs with low CE levels. However, UEs experiencing a higher CE level, i.e., having a worse RSRP result and lower SNR. are likely to be more distant from the eNB and will likely experience a larger delay. A larger tone hopping distance may lead to increased ambiguity for these higher CE level UEs. Therefore, a shorter tone hopping distance PRACH may be more beneficial for higher CE level UEs. In order to address the needs of both the lower CE level UEs and the higher CE level UEs, a PRACH may be transmitted using two different tone hopping distances, e.g., a shorter hopping distance and a larger tone hopping distance. While the larger tone hopping distance may improve the accuracy of the timing estimation, larger tone hopping spacing may lead to ambiguity for higher CE level UEs that experience a larger delay. By using two different tone hopping distances, a smaller tone hopping spacing may be used to help resolve the ambiguity from the larger tone hopping spacing.

Figure 5:
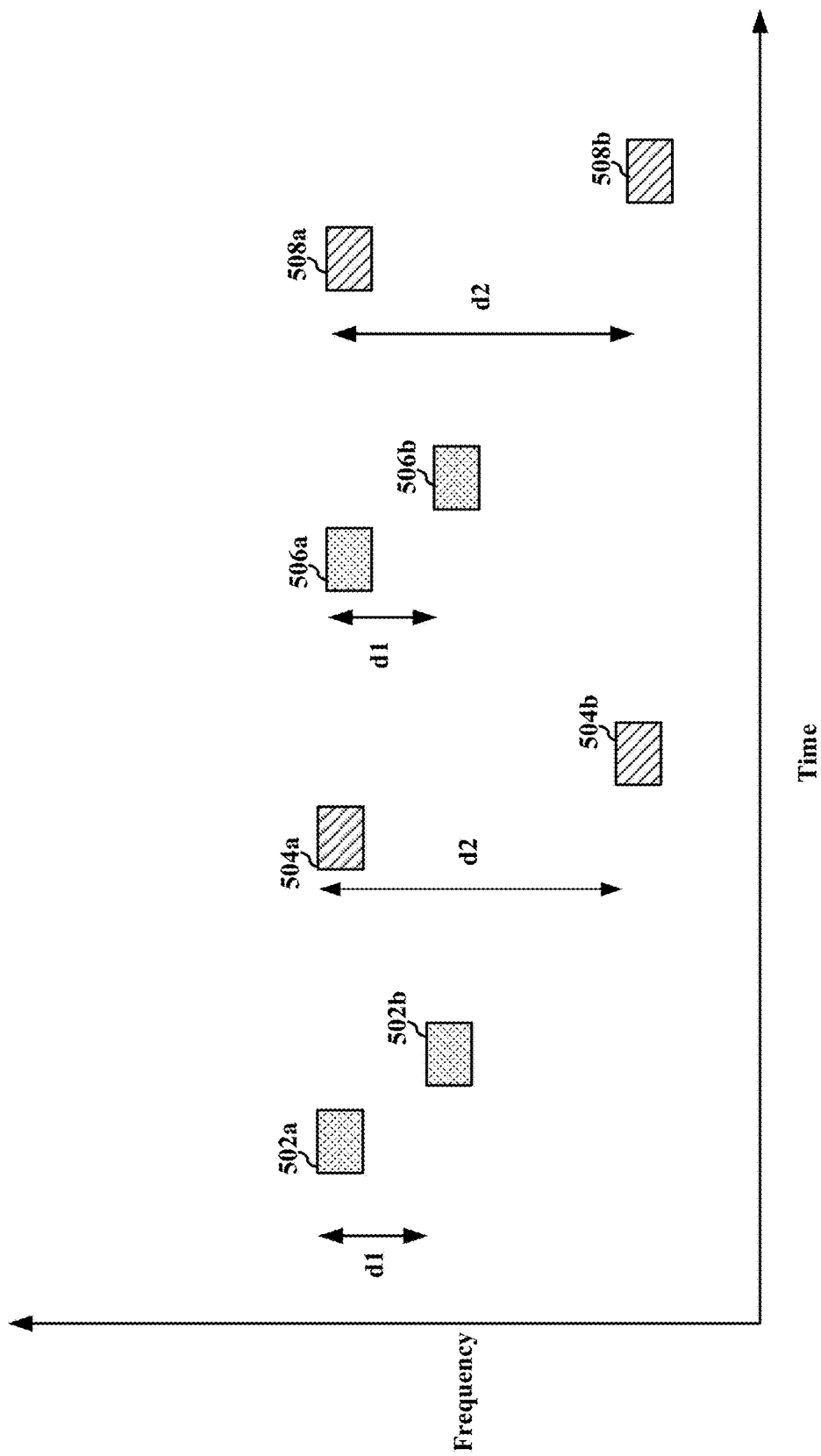
FIG. 5 illustrates the use of different tone hopping distances for a same transmitting, in accordance with aspects presented herein.

The timing accuracy of the PRACH relates to the tone hop distance. UEs at higher CE levels are those with the worse RSRP and low SNR, and therefore likely to experience a larger delay due to distance from the eNB In order to improve the timing accuracy of the UEs at the higher CE levels, different tone hop distances may be used for the same UE at a high CE level. Thus, one tone hopping distance may provide a small tone hopping distance to cover the larger delays that may be experienced by the UE. Another set of symbols may be transmitted with a larger hopping distance in order to increase the timing accuracy of the PRACH. FIG. 5 illustrates an example showing a first set of tones 502a, 502b that are transmitted using a smaller tone hopping distance d1 and a second set of tones 504a, 504b that are transmitted using a larger tone hopping distance d2. Although two tones, e.g., 502a, 502b and 504a, 504b are illustrated for the two different fixed hopping distances d1, d2, any number of tones may be transmitted at each of the fixed hopping distances d1, d2. For example, four tones, not illustrated, may be transmitted using the shorter hopping distance d1 before transmitting a number of tones at the larger hopping distance d2. Additionally, four tones, not illustrated, may be transmitted at the longer hopping distance d2 before using a different hopping distance between tones. Furthermore, the number of tones used at the two different, fixed hopping distances may be different. For example, a number n1 of tones may be transmitted using a hopping distance of d1 between adjacent tones, and a second number n2 of tones may be transmitted using a second hopping distance d2 between adjacent tones. The numbers n1, n2 may be the same or may be different. Additionally, a pattern of using short and long hopping distances may be repeated, e.g., by using a hopping distance d1 for tones 506a, 506b and a hopping distance d2 for tones 508a, 508b.

In one example, d2 may be any integer multiple of d1, e.g., d2=n*d1 with n>1. If d2=2*d1 and the first tone 502a is at position Tone 2, the second tone 502b will be at Tone 7, so that d1=5. In this example, d2=10. The separation between the second tone (Tone 7) and a third tone may be random. For example, the third tone may be at Tone 0 having a fourth tone at Tone 10, because d2=10. A third tone, e.g., 504a is not necessarily at Tone 0. A random hopping distance may also be employed between tones of the PRACH. For example, third tone 504a may be a random hopping distance from the second tone 502b, e.g., as illustrated for 414 in connection with FIG. 4. However, the tone following the third tone, e.g., fourth tone 504b will have a distance of 10 from the third tone. It is not the particular tones that are required, but instead the distance between tones, e.g., d1 and d2, and the relationship between d1 and d2, e.g. d2=d1*n.

Figure 7:
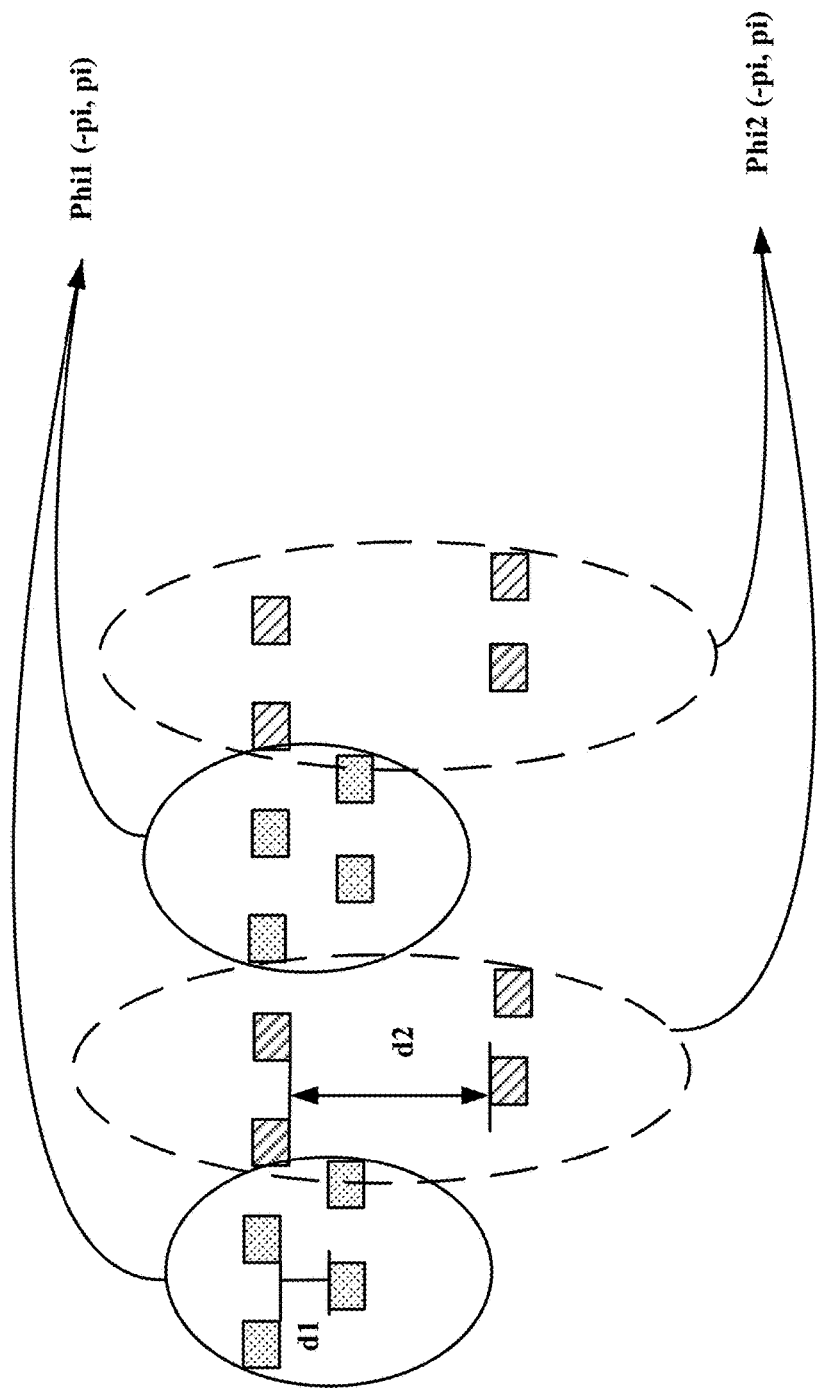
FIG. 7 illustrates aspects of receiving PRACH tones, in accordance with aspects presented herein.

As illustrated in FIG. 7, the PRACH may also include additional sets of tones, e.g., 706, 708.

Figure 6:
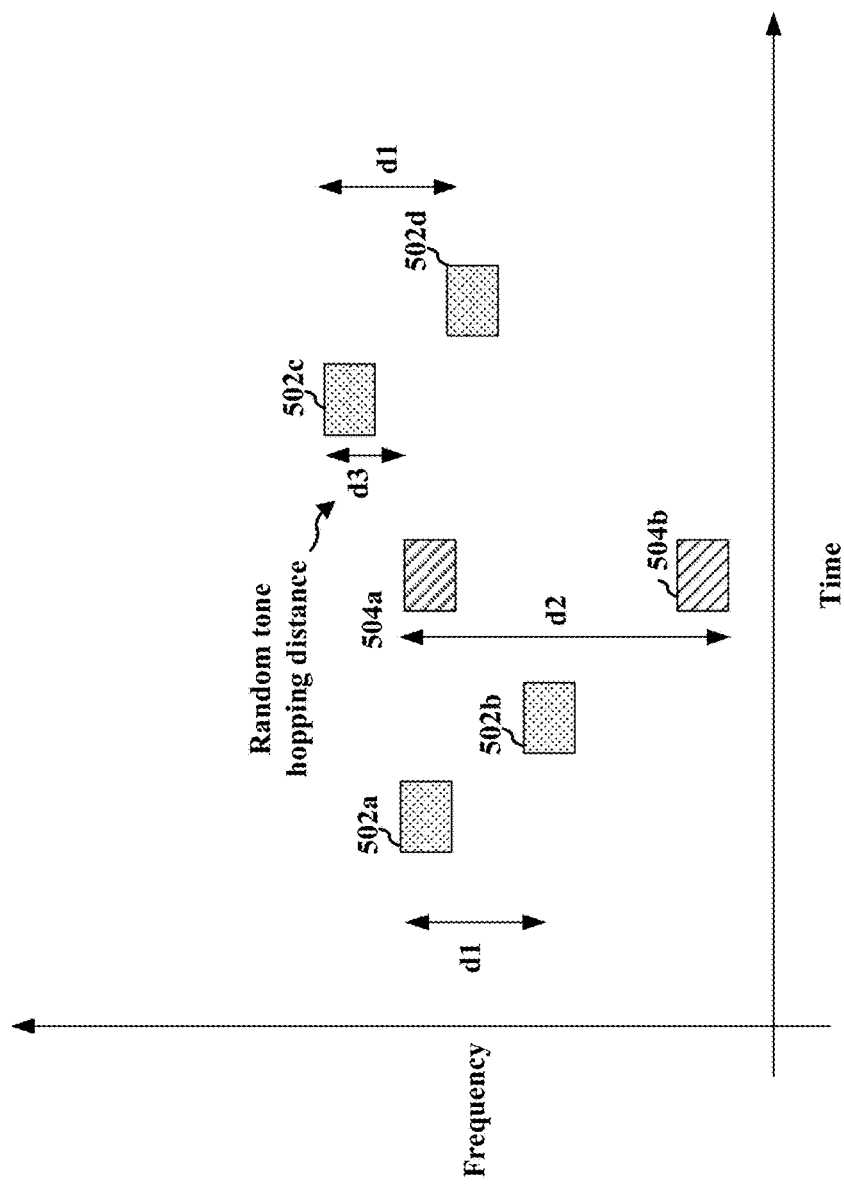
FIG. 6 illustrates aspects of receiving PRACH tones, in accordance with aspects presented herein.

Hopping distances d1 and d2 may be fixed hopping distances of different sizes. These hopping distances may be used in connection with random hopping distances. For example, FIG. 6 illustrates a random hopping distance d3 between tones of a short hopping distance d1 and tones of a larger hopping distance d2. The fixed hopping distances may be relative to a reference tone. The reference tone may be the same for both the shorter fixed hopping distance and the longer fixed hopping distance.

The hopping distances may cycle in a pattern for the PRACH, e.g., a random hopping distance may be used, followed by a short hopping distance, a long hopping distance, and a short hopping distance, before another random hopping distance is used. The pattern may then repeat, e.g., random hopping distance, short hopping distance, long hopping distance, short hopping distance, random hopping distance, short hopping distance, long hopping distance, short hopping distance, random hopping distance, . . . or other variations.

A receiver may receive the PRACH tones at the at least two different, fixed hopping distances and may use the two fixed hopping distances to determine a timing offset estimation. For example, the receiver may, first, determine two sets of phase estimations phi1, phi2 from the sets of tone hopping distances (d1, d2), e.g., as illustrated in FIG. 7. Then, the receiver may use a first phase estimation (phi1) to select the hypothesis corresponding to the second phase estimation (phi2). Then, the first phase estimation may be updated based on the selected hypothesis.

For a receiver, the larger the difference in d2/d1, the better the timing estimation hypothesis phi2 will be. However, as the number of hypotheses increase, there is a higher likelihood of selecting an incorrect hypothesis, which may lead to an inaccurate timing estimation.

For example, if d2 is twice the distance of d1, so that d2=2*d1, three Phi estimation hypotheses for phi1 may be based on phi2, e.g.:

$phi1_1 = phi2/2$ $phi1_2 = (phi2+2pi)/2$ $phi13 = (phi2-2pi)/2$

With these three hypotheses, the receiver may determine the best hypothesis:

$phi1_{new} = \mathrm{argmin}(|phi1_i - phi1|)$ $= \min(|phi1_1-phi1|, |phi1_2-phi1|, |phi1_3-phi1|)$ Then, a final phi1 estimation may be:

Final $phi1_{est} = (phi1_{new}*2+phi1)/3$

The delay may then be determined as corresponding to Phi1 est.

Although this example, has been presented for d2=2*d1, a different factor may be used between the distances d2 and d1. For example, if d2=4*d1, in addition to the three Phi estimation hypotheses supra, there would also be additional hypotheses:

$Phi1\_4 = (phi2+4pi)/4$ $Phi1\_5 = (phi2-4pi)/4$

In this example, with the additional Phi estimation hypotheses, a final phi1 estimation may be, e.g.:

Final $phi1_{est} = (phi1_{new}*4+phi1)/5$

The Final $phi1_{est}$ may be a weighted combination of phi1_new and phi1. Options for the weight may include zero, for example.

Figures 8A, 8B:
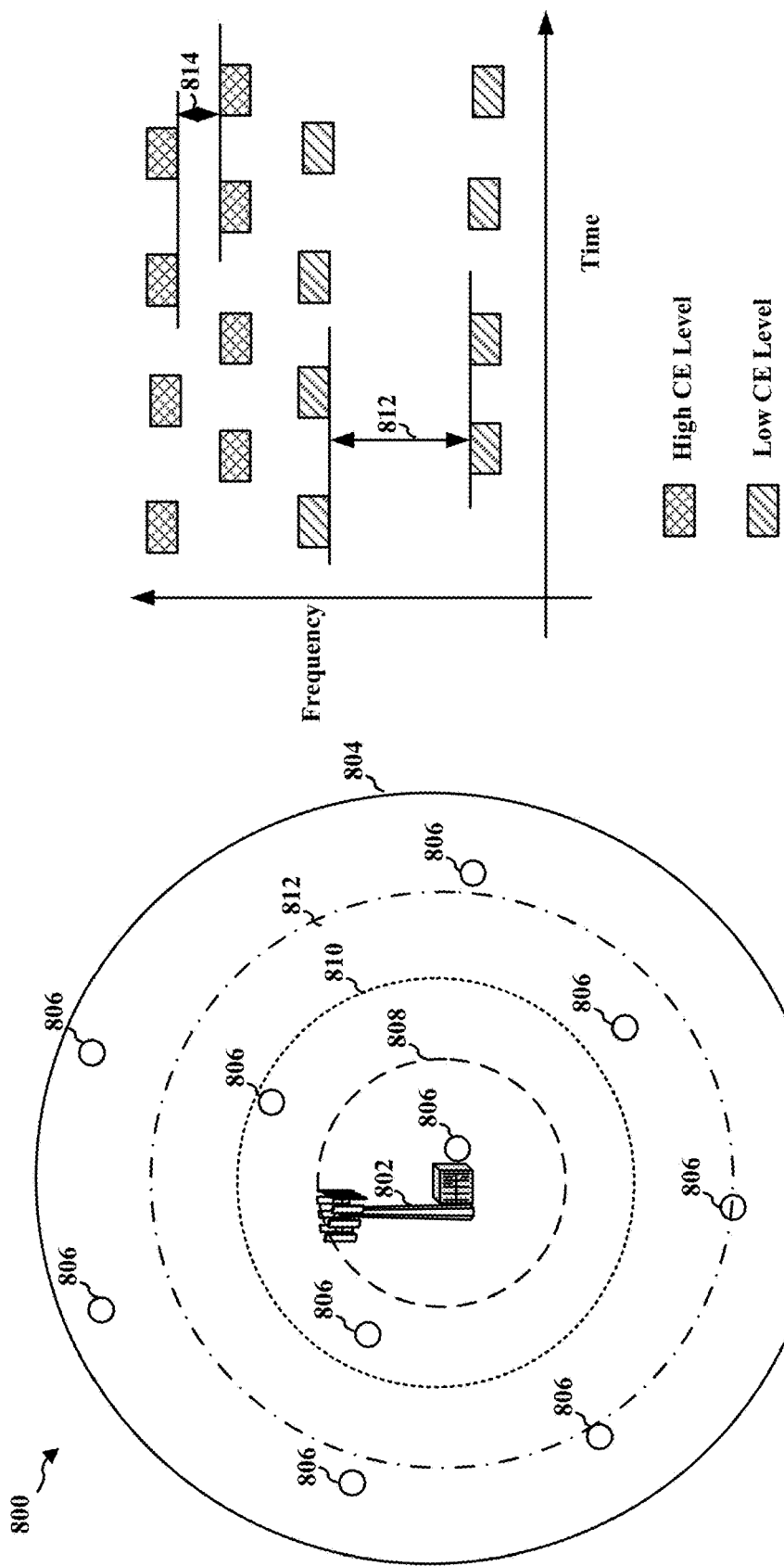
FIG. 8A illustrates aspects of a wireless communication system in accordance with aspects presented herein.
FIG. 8B illustrates a correspondence of tone hopping distances to CE levels, in accordance with aspects presented herein.

In another aspect, a transmitter may address the accuracy of the timing estimation by using or selecting a tone hopping distance between transmissions of a NB PRACH based on a Coverage Enhancement (CE) level. FIG. 8A illustrates an example NB wireless communication system 800. An eNB 802 provides a coverage area within border 804. Multiple users 804 are within coverage area 804 of the eNB 802. These users might not all be active at the same time. However, the NB communication should designed to support the multiple users.

A good RSRP result and/or a high SNR will typically mean that the UE 806 is close to the cell center 802. The closer to the cell center, the smaller the delay that will be experience for communication between the eNB and the UE 806.

A low RSRP result or a lower SNR may be due to any of a number of factors. For example, such as result may indicate that the UE 806 is farther away from eNB 802. It may also mean that a less desirable channel is used for the communication, e.g., if the UE 806 is physically close to the eNB 802, but is located in a basement or has other obstructions between the UE 806 and the eNB 802. In these situations, the delay may be larger, e.g., when the UE 806 is located at a farther distance from the eNB 802. FIG. 8A illustrates three radii 808, 810, 812 with different distances from the eNB.

The timing accuracy of the PRACH may be coupled with the tone hop distance used for the PRACH. The distance between tones provides scaling that is used in determining the timing offset. The accuracy of the timing estimation increases with the tone hop distance used for the PRACH. However, it may be problematic to increase the tone hop distance for UEs 806 that are distant from the eNB 802, because they experience a larger delay. Therefore, different tone hop distances may be used for different PRACH CE levels. Each PRACH CE level may be associated with a reference RSRP measurement or reference SNR measurement. Thus, a UE 806 may determine its CE level using a RSRP result and/or an SNR.

For example, a first CE level may be associated with a first reference RSRP and a first SNR. These reference levels may typically correspond to UEs within radius 808 that are closer to eNB 802. When a UE 806 determines that it has an RSRP above the first reference RSRP and/or an SNR above the first reference SNR, the UE may determine that it is within the first CE level and may select a tone hopping distance corresponding to the first CE level.

A second CE level may be associated with a second reference RSRP and a second SNR. These reference levels may typically correspond to UEs within radius 810 that are not as close to eNB 802 as those within the first radius 808, and that are closer than those within radius 812. However, as the CE level is based on RSRP and/or SNR measurements, it may also encompass UEs 804 that are within radius 808, but that are experiencing a bad channel or other issues. When a UE 806 determines that it has an RSRP above the second reference RSRP but not the first reference RSRP and/or an SNR above the second reference SNR but not the first reference SNR, the UE may determine that it is within the second CE level and may select a tone hopping distance corresponding to the second CE level.

A third CE level may be associated with a third reference RSRP and a third SNR. These reference levels may typically correspond to UEs within radius 812 that are not as close to eNB 802 as those within the first radius 808 or the second radius 810. When a UE 806 determines that it has an RSRP above the third reference RSRP but not the first and second reference RSRPs and/or an SNR above the third reference SNR but not the first and second reference SNRs, the UE may determine that it is within the third CE level and may select a tone hopping distance corresponding to the third CE level.

A fourth CE level may correspond to UEs within the coverage area 804 but that are more distant than those in radii 808, 810, and 812. When a UE 806 determines that it has an RSRP that is not above the first, second or third reference RSRPs and/or an SNR that is not above the first, second, or third reference SNRs, the UE may determine that it is within the fourth CE level and may select a tone hopping distance corresponding to the fourth CE level.

Although this example includes four CE levels, this is merely to illustrate the determination of a CE level in order to select a tone hopping distance. Any number of CE levels may be established and associated with a tone hopping distance.

For those CE levels having better RSRP results and/or higher SNR measurements, the UE 806 is likely closer to the eNB 802 and will experience a smaller delay. Therefore, a larger tone hopping distance may be used between tones of the PRACH for the UE. In FIG. 8A, the UEs 804 meeting the criteria of the first CE level, and thus likely being within radius 808, may use, e.g., a larger PRACH tone hopping distance than those outside of radius 808.

UEs meeting the measurement criteria of the second CE level are likely located within the second radius 810 but outside of radius 808. Thus, these UEs will likely experience a somewhat larger delay than those of the first CE level. Therefore, UEs of the second CE level may use a smaller PRACH tone hopping distance than UEs of the first CE level. These UEs will also likely experience a smaller delay than those outside the radius 810. Therefore, the tone hopping distance for the second CE level may be larger than that for the third and fourth CE levels.

UEs meeting the measurement criteria of the third CE level are likely located within the third radius 812 but outside of radii 808 and 810. Thus, these UEs will likely experience a somewhat larger delay than those of the first and second CE levels. Therefore, UEs of the third CE level may use a smaller PRACH tone hopping distance than UEs of the first and the second CE levels in order to avoid incurring PRACH problems associate with the delay. These UEs will also likely experience a smaller delay than those outside the radius 812. Therefore, the tone hopping distance for the third CE level may be larger than that for the fourth CE level.

UEs not meeting the measurement criteria of the first, second or third CE levels are likely located within the coverage area 804 of the eNB but outside of radii 808, 810, and 812. Thus, these UEs will likely experience a larger delay than those of the first, second, and third CE levels. Therefore, UEs of the fourth CE level may use a smaller PRACH tone hopping distance than UEs of the first, second, and third CE levels in order to avoid incurring PRACH problems associate with the delay.

Therefore, of the four CE levels, the PRACH tone hopping distance of the first CE level may be the longest and the PRACH tone hopping distance of the fourth CE level may be the shortest.

FIG. 8B illustrates the difference in tone hopping spacing for a low CE level and a high CE level, as illustrated in FIG. 8A. UEs that meet the criteria for a low CE level, i.e., one having a better RSRP result and a higher SNR, and therefore experiencing a smaller delay have a larger tone hopping spacing 802 than that of UEs of the higher CE level. By increasing the tone hopping distance, the accuracy of the timing estimation is improved.

UEs that do not meet the criteria of the low CE level, i.e., having a worse RSRP result and lower SNR than the low CE level, therefore, are likely to be more distant from the eNB 802 and will likely experience a larger delay. Therefore, the tone hopping distance 804 for the high CE level is smaller than that for the low CE level. Although a larger tone hopping distance could improve the accuracy of the timing estimation, larger tone hopping spacing is problematic for UEs that experience a larger delay. Therefore, a smaller tone hopping spacing may be used.

Figure 9:
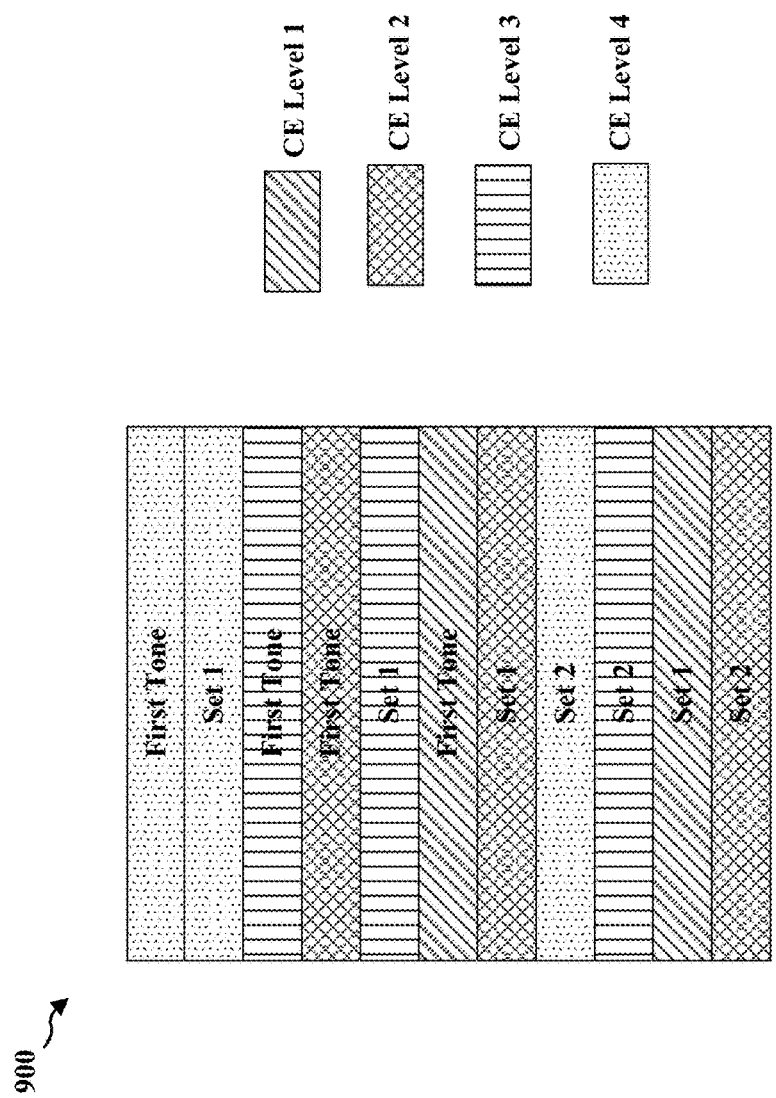
FIG. 9 illustrates multiplexing of multiple transmission regions corresponding to different CE levels, in accordance with aspects presented herein.

FIG. 9 illustrates that aspects may further include user multiplexing sets of transmission resources 900. Managing the resources of the NB may include using FDM for different power classes. For example, transmission resources, also referred to as regions, may be established for different CE levels. As illustrated in FIG. 9, the regions may be interlaced together.

In one example, a transmitter may use random hopping, but may perform the random hop within the transmission resources for its respective CE level.

Such user multiplexing may be used in combination with the use of a larger tone hopping distance depending on a CE level of a transmitter. This may also include the use of two sets of tone hopping distances, one with a smaller distance and one with a larger distance between tones. The use of two sets of tone hopping distances may be used in connection with higher CE levels, whereas a lowest CE level may only need a single, longer tone hopping distance.

The UE may obtain information regarding the transmission resources for the different CE levels in any of a number of ways. For example, the information may be signaled to the UE. In one example, a UE may receive explicit signaling from an eNB regarding the transmission resources for a CE level prior to transmitting PRACH. Such signaling may be sent to the UE as System Information Block(s) (SIB(s)). In another example, transmission resources for CE levels may be fixed or standardized and known by the UE. In another example, there may be a few fixed or known options of transmission resource sets for different CE levels. Then, one of those options may be signaled to the UE so that the UE knows which of the options should be used for its particular PRACH transmissions.

Figure 10:
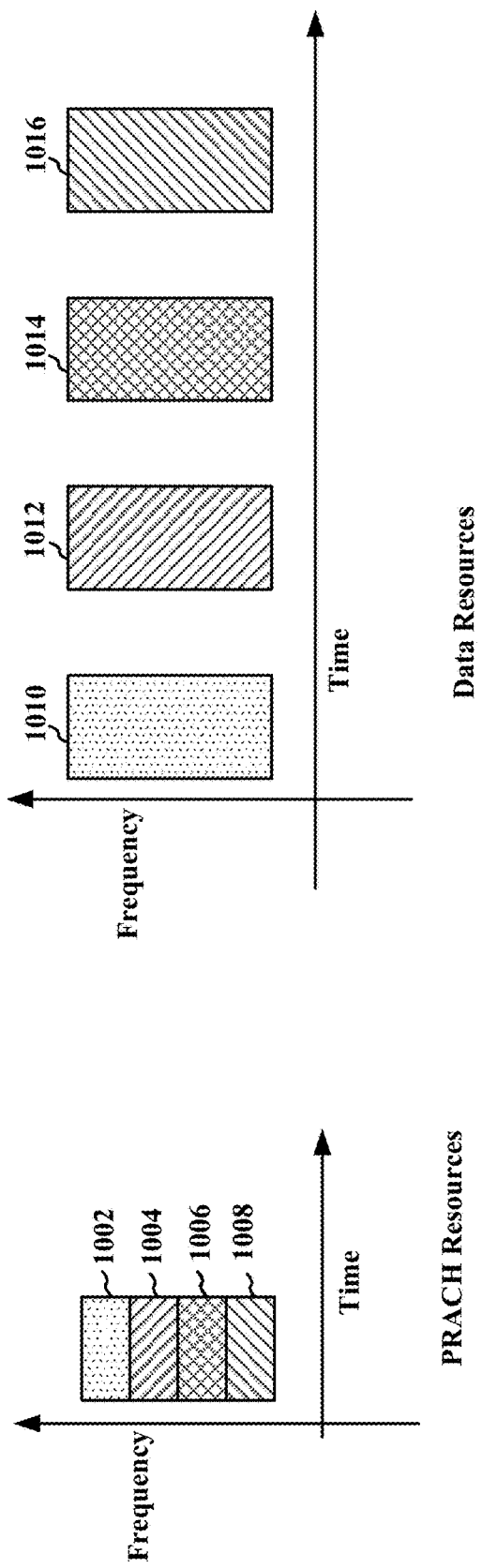
FIG. 10 illustrates an example mapping between tones of a PRACH and data resources, in accordance with aspects presented herein.

A mapping may exist between the location of a first tone of PRACH and the data resource for a corresponding data transmission. FIG. 10 illustrates that PRACH resource for tone 1002 corresponds to data resource 1010; PRACH resource for tone 1004 corresponds to data resource 1012; PRACH resource for tone 1006 corresponds to data resource 1014; and PRACH resource for tone 1008 corresponds to data resource 1016. This enables a UE to know when to expect a data message from the eNB. As described supra tone spacing for PRACH may be different than tone spacing for data transmissions. For example, tone spacing for PRACH may be PRACH 15 kHz/16, while tone spacing for data transmissions may be 15 kHz or 3.75 Hz. Thus, the first tone of a PRACH, e.g., msg1, may be mapped to data transmission resources corresponding to a certain tone or time grid, e.g., for msg2 and msg3.

Different CE levels may be associated with a different Timing Advance (TA) Granularity. For example, a low CE level, having a good RSRP/high SNR may use a higher TA granularity. A UE with a higher CE level, having a worse RSRP/lower SNR, may use a lower TA granularity. For example, the low CE level UE may use a TA granularity where one bit corresponds to 0.5 μs, whereas the high level UE may use a TA granularity where on bit corresponds to 1 or 2 μs.

CE level determinations may be performed in either an idle or a connected state for the UE. For example, a CE level determination may be made along with an initial power selection.

Figure 11:
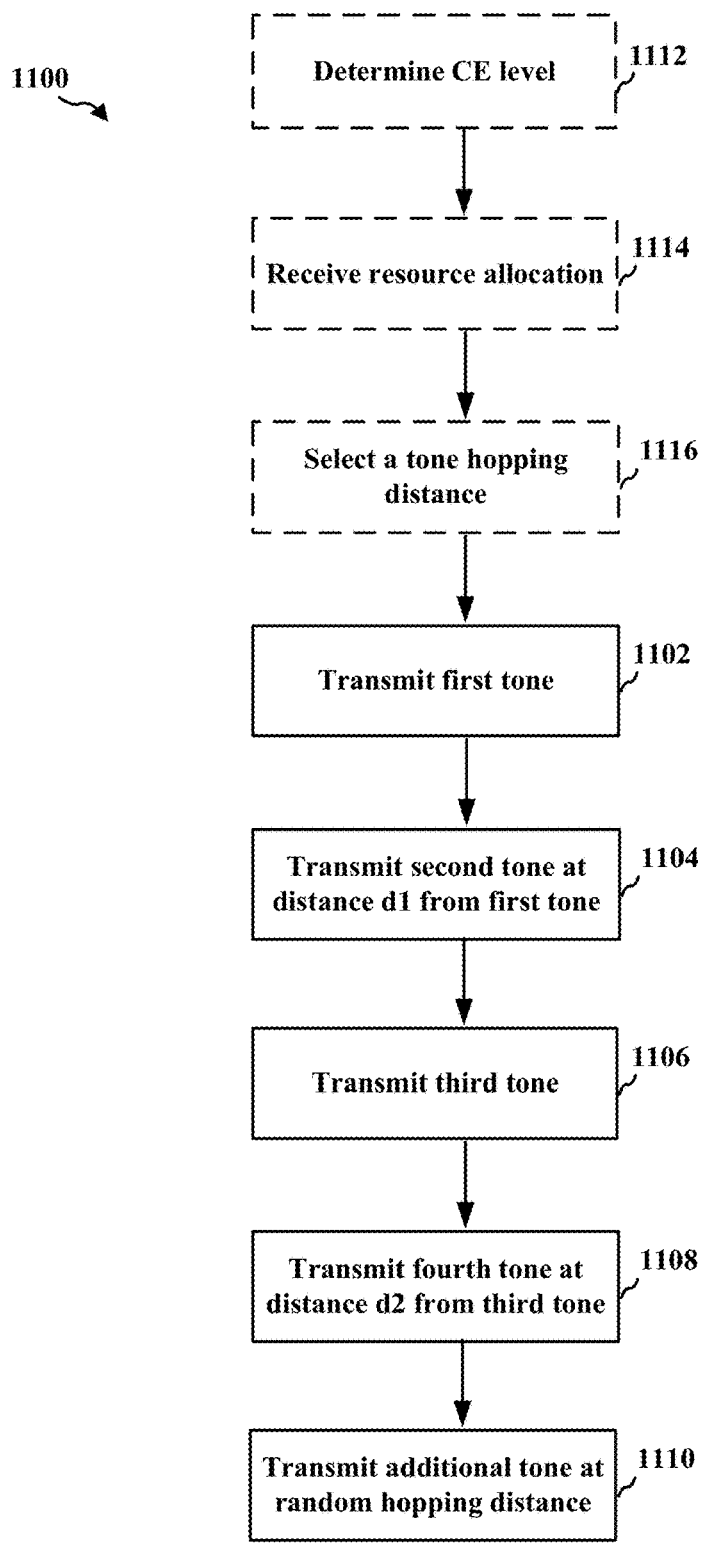
FIG. 11 is a flowchart of a method of wireless communication.

FIG. 11 is a flowchart 1100 of a method of wireless communication. The wireless communication may be NB wireless communication. Among other types of narrow band communication, the wireless communication may be NB-IOT. The communication may be limited to a narrow system bandwidth, such as 1 RB, and may be capable of multi-user communication. The method may be performed by a transmitter, such as a UE (e.g., the UE 104, 350, 804, 1550, the apparatus 1202/1202').

At 1102, the UE transmits a first tone of a PRACH. At 1104, the UE transmits a second tone of the PRACH at a first hopping distance from the first tone transmitted at 1102. At 1106, the UE transmits a third tone of the PRACH, and at 1108, the UE transmits a fourth tone of the PRACH at a second hopping distance from the third tone transmitted at 1106. The naming of the tones, i.e., first tone, second tone, third tone, and fourth tone, is not meant to attribute an order to their transmission. For example, the third tone and fourth may be transmitted prior to the first and second tones.

The first tone may be d1 and the second tone may be d2, e.g., as illustrated in FIGS. 4-7. For example, the second hopping distance may be d2 and may be greater than the first hopping distance, e.g., d1. The second hopping distance may correspond to the first hopping distance multiplied by an integer greater than 1. Thus, the second hopping distance may correspond to the first hopping distance multiplied by an integer greater than 1, e.g., d2=d1*n, n being an scaler greater than 1 preferably an integer.

The use of a larger tone hopping distance, e.g., d2 may improve the timing accuracy for the PRACH, while the shorter distance, e.g., d1, may allow for UEs that are distant from the eNB. Thus, in this example, the first and second tones may similar to either the set 502 or 506, and the third and fourth tones may be similar to set 504 or 508 in FIGS. 5 and/or 6.

The first hopping distance and the second hopping distance may be different fixed hopping distances. In contrast to the fixed distance, e.g., d1 or d2, between the first and the second tone and the third and the fourth tones, the hopping distance between a first tone 502a and a third tone, 504a may correspond to random hopping distance d3. As the naming of the tones, i.e., first tone, second tone, etc., is not meant to attribute an order to their transmission. In one example, a random hopping distance may be employed between groups of tone having different fixed hopping distances. In one example, a second group of 4 tones having a fixed hopping distance d2 may have a random group hopping distance from a fourth tone of a first group of 4 tones having a fixed hopping distance d1. Similarly, the hopping distance between a fourth tone, e.g., in set 508 and first tone 502a may correspond to a random hopping distance. Thus, at 1110, the UE may transmit an additional tone of the PRACH using a random hopping distance. The UE may transmit the tones of the PRACH using a pattern, e.g., a random hopping distance may be used, followed by a short hopping distance, a long hopping distance, and a short hopping distance, before another random hopping distance is used. The pattern may then repeat, e.g., random hopping distance, short hopping distance, long hopping distance, short hopping distance, random hopping distance, short hopping distance, long hopping distance, short hopping distance, random hopping distance, . . . .

Optional aspects are illustrated in FIG. 11 with a dashed line.

As illustrated at 1112, the UE may optionally determine its CE level in order to select a hopping distance based on the CE level at 1116, e.g., as described in connection with FIG. 8. The CE level may be determined based on a RSRP or SNR for the UE, as described in connection with FIG. 8. Then, the UE may base the selection of the first hopping distance on the determination of the CE level. For example, a first distance may be selected as the first hopping distance when the CE level is below a reference level and a second distance may selected as the first hopping distance when the CE level is above the reference level, the first distance being greater than the second distance. Thus, as described in connection with FIGS. 6 and 7, a larger hopping distance 812 may be selected for a low CE level having a better RSRP/high SNR, and a smaller hopping distance 814 may be selected for a high CE level having a worse RSRP/low SNR.

This example, may be for a high CE level, where the selected first hopping distance would be smaller, e.g., similar to d1.

The UE may also receive resource allocation information at 1114. This resource allocation information may inform the UE of resources associated with the CE level. For example, the UE may receive resource allocation information mapping tones in a transmission resource to the CE level. The first tone, the second tone, the third tone and the fourth tone may be transmitted within a transmission resource indicated by the resource allocation information. As described in connection with FIG. 9, each CE level may be associated with tones in a transmission resource, and the transmission resources may be interlaced with each other.

In another example, CE levels may map to tones in a fixed transmission resource, and the first tone, the second tone, the third and the fourth tone may be transmitted within the fixed transmission resource.

In another example, CE level may map to tones in a plurality of fixed transmission resources, and the UE may receive resource allocation information corresponding to the CE level at 1114. The first tone, the second tone, the third tone, and the fourth tone may then be transmitted within one of the fixed transmission resources indicated by the resource allocation information.

Different CE levels may be associated with different TA granularities so that a first CE level is associated with a different TA granularity than a second CE level.

Spacing between tones for the PRACH may be different than spacing between tones for a corresponding downlink data transmission. At least the first tone may be mapped to a position for the corresponding uplink data transmission or downlink data transmission following a successful PRACH transmission, e.g., as described in connection with FIG. 10. This enables the UE to know where to expect a data transmission from an eNB.

Figure 12:
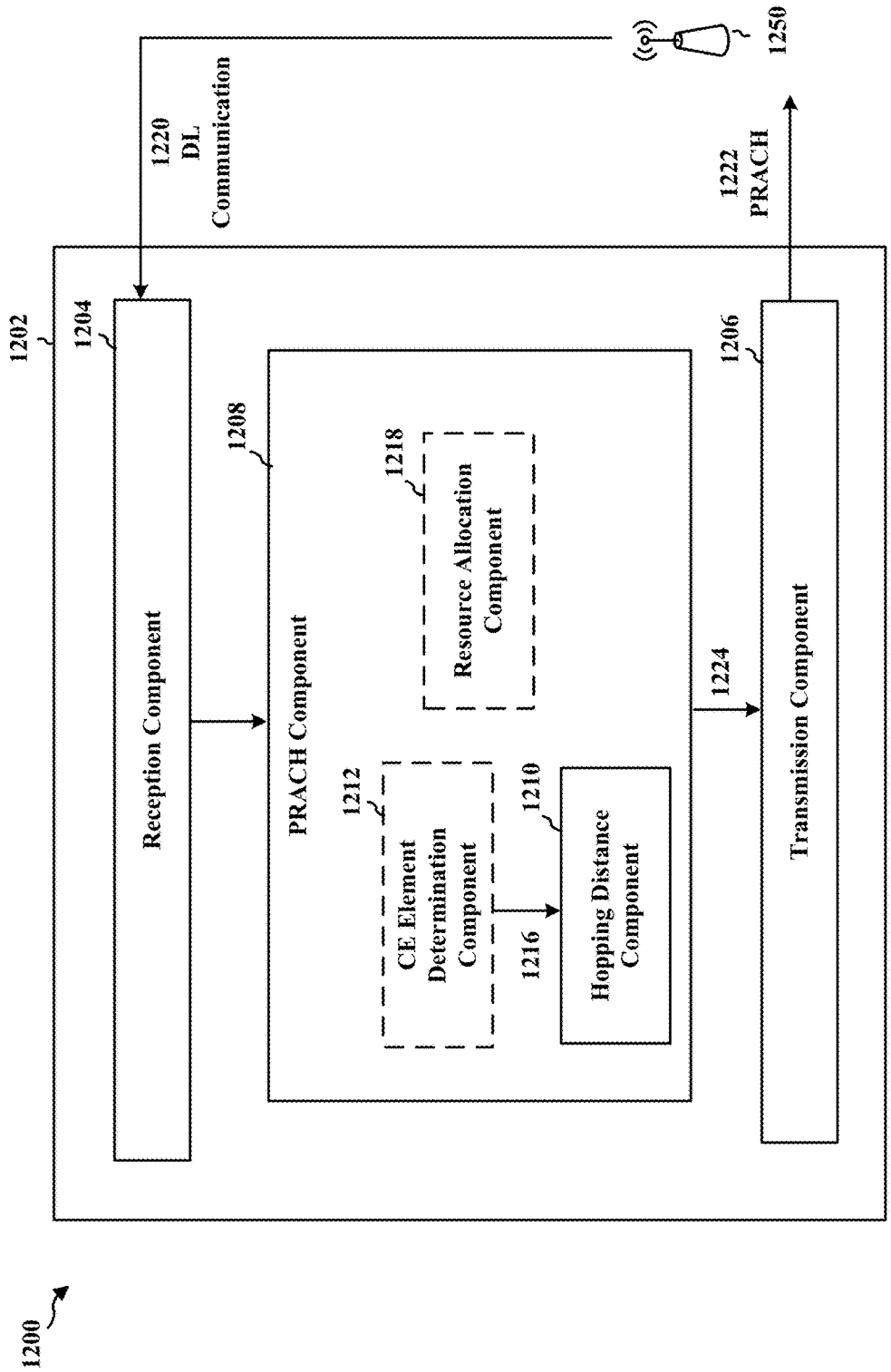
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus may be a UE. The apparatus includes a reception component 1204 that receives communication 1220 from eNB 1250 and a transmission component 1206 that transmits communication 1222 to eNB 1250 such as PRACH transmissions described in connection with FIGS. 4-10. The apparatus includes a PRACH component 1208 that generates multiple tones of a PRACH having at least two, different hopping distances between tones, e.g., as described in connection with FIGS. 4-10. The PRACH component 1208 may include a hopping distance component 1210 that determines the hopping distances for the PRACH transmissions. The hopping distances may include two different fixed distances and a random hopping distances, etc.

The PRACH component 1208 may include a CE level determination component 1212 that determines the CE level, e.g., using a RSRP/SNR for the apparatus. The RSRP/SNR may be provide by the reception component 1204 to the CE element determination component 1212. The CE level determination component 1212 may provide the CE level at 1216 to the hopping distance selection component 1210 for use in selecting the hopping distance. The hopping distance component 1210 may then select at least one hopping distance between tone transmissions of a PRACH based on a CE level.

The transmission component 1206 may be configured to transmit the tones of the PRACH, e.g., any of the first, second, third, and fourth tones in FIG. 11. For example, the PRACH component 1208 may provide the PRACH and the distances to the transmission component at 1224. The transmission component 1206 may use the different hopping distances to transmit the tones of the PRACH, e.g., as described in connection with FIG. 11.

The reception component 1204 may be configured to receive resource allocations for the CE levels, which may be provided to a resource allocation component 1218 of PRACH component 1208. The reception component may provide the resource allocations to the PRACH component 1208 so that the PRACH component 1208 can use the indicated transmission resources for generating the PRACH.

The apparatus may include additional components that perform each of the blocks of the algorithm in the aforementioned flowcharts of FIG. 11 and the aspects described in connection with FIGS. 4-10. As such, each block in the aforementioned flowcharts of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
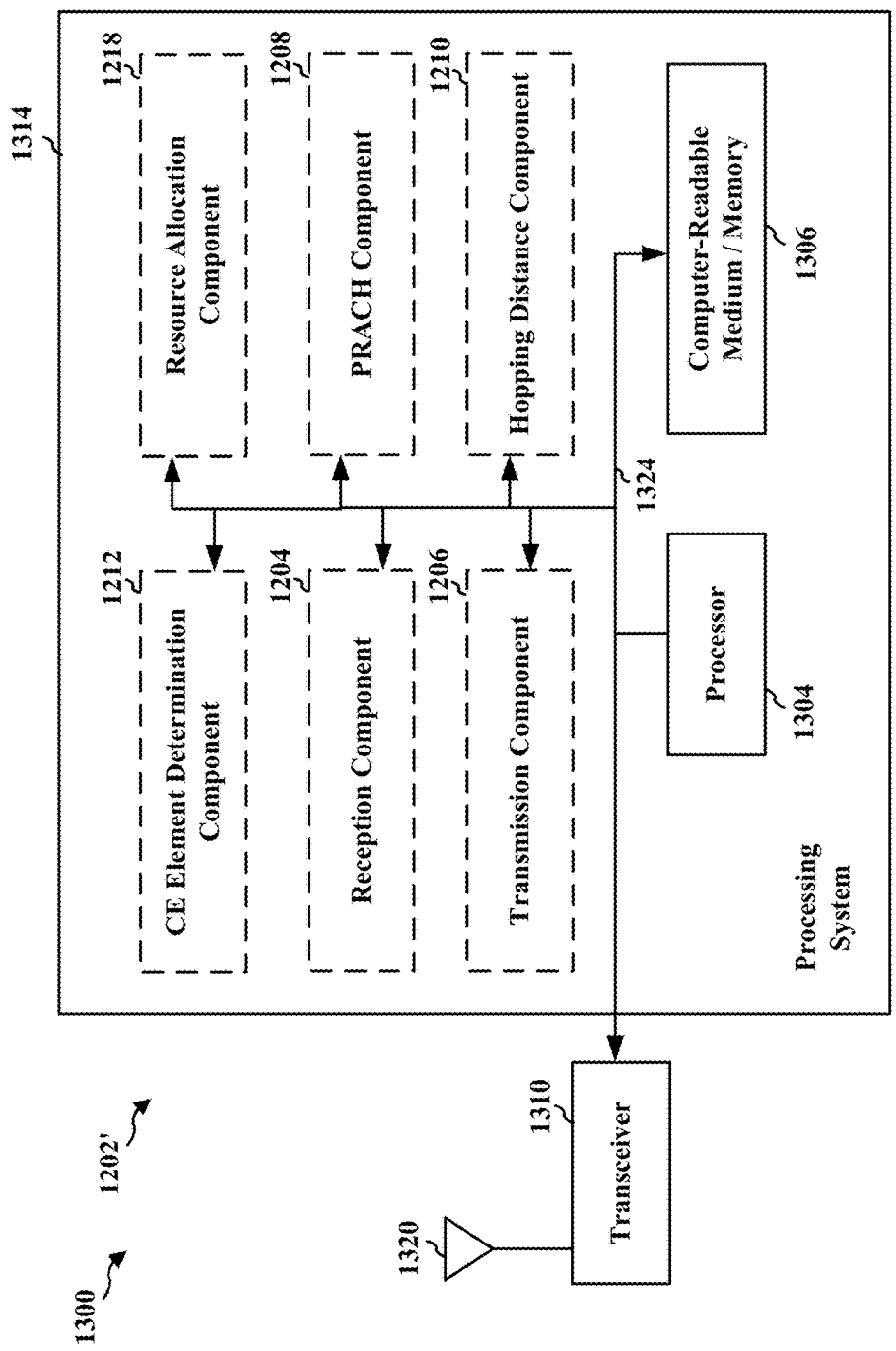
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212, 1218, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1206, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212, 1218. The components may be software components running in the processor 1304, resident/stored in the computer readable medium/memory 1306, one or more hardware components coupled to the processor 1304, or some combination thereof. The processing system 1314 may be a component of the UE 350 and may include the memory 360 and/or at least one of the TX processor 368, the RX processor 356, and the controller/processor 359.

In one configuration, the apparatus 1202/1202' for wireless communication includes means for transmitting a first PRACH tone, a second PRACH tone at a first hopping distance from the first PRACH tone, a third PRACH tone, and a fourth PRACH tone at a second hopping distance from the third PRACH tone; means for transmitting an additional PRACH tone at a random hopping distance; means for selecting a first hopping distance between tone transmissions of a PRACH based on a CE level; means for determining the CE level; and means for receiving resource allocation information. The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 14:
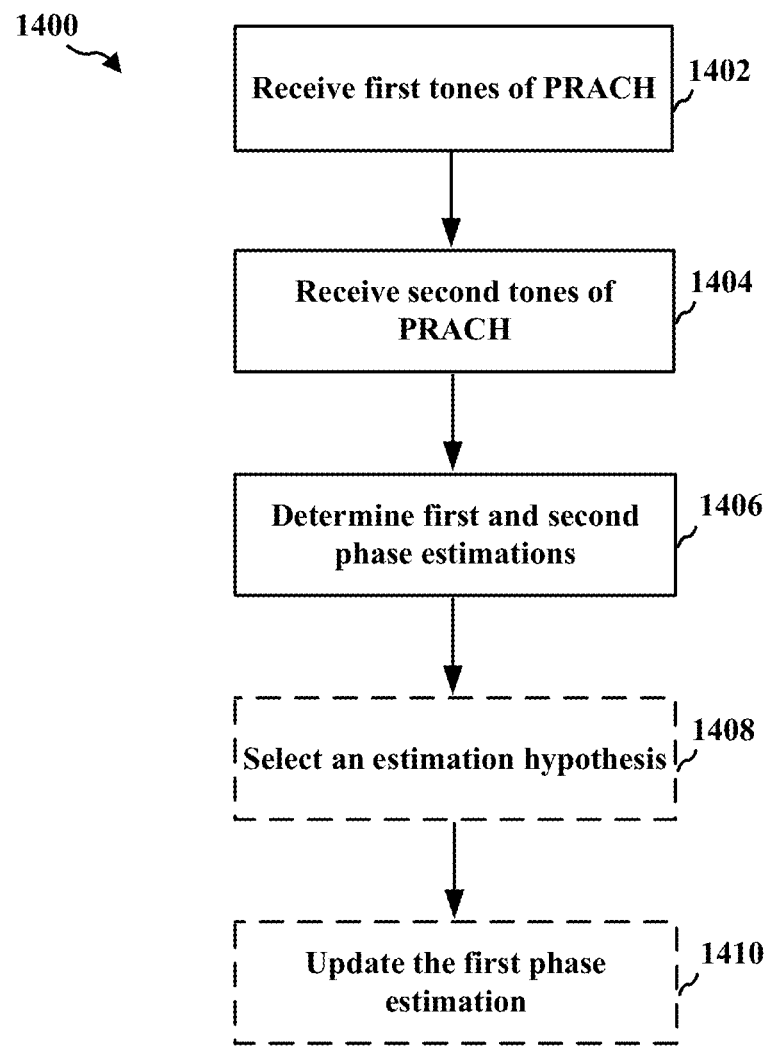
FIG. 14 is a flowchart of a method of wireless communication.

FIG. 14 is a flowchart 1400 of a method of wireless communication. The wireless communication may be NB wireless communication. Among other types of narrow band communication, the wireless communication may be NB-IOT. The communication may be limited to a narrow system bandwidth, such as 1 RB, and may be capable of multi-user communication. The method may be performed by a receiver, such as a eNB (e.g., the eNB 102, 310, 802, 1250, the apparatus 1502/1502').

At 1402, the eNB receives a first set of tones of a PRACH at a first tone hopping distance. At 1404, the eNB receives a second set of tones of a PRACH at a second tone hopping distance. The naming of the tones, i.e., first tone, second tone, third tone, and fourth tone, is not meant to attribute an order to their transmission. For example, the third tone and/or fourth may be transmitted prior to the first and/or second tones.

The first tone may be d1 and the second tone may be d2, e.g., as illustrated in FIGS. 4-7. For example, the second hopping distance may be d2 and may be greater than the first hopping distance, e.g., d1. The second hopping distance may correspond to the first hopping distance multiplied by an integer greater than 1. Thus, the second hopping distance may correspond to the first hopping distance multiplied by an integer greater than 1, e.g., d2=d1*n, n being an scaler greater than 1 preferably an integer.

The use of a larger tone hopping distance, e.g., d2 may improve the timing accuracy for the PRACH made by the eNB, while the shorter distance, e.g., d1, may allow for UEs that are distant from the eNB. Thus, in this example, the first and second tones may similar to either the set 502 or 506, and the third and fourth tones may be similar to set 504 or 508 in FIGS. 5 and/or 6.

The first hopping distance and the second hopping distance may be different, fixed hopping distances. In contrast to the fixed distance, e.g., d1 or d2, between the first and the second tone and the third and the fourth tones, the hopping distance between a first tone 502*a* and a third tone, 504*a* may correspond to random hopping distance d3.

After receiving the two sets of tones, the eNB determines at 1406 a first set of phase estimations (phi1) based on the first set of tones and a second set of phase estimations (phi2) based on the second set of tones.

The eNB may also use the first phase estimation (phi1) to select an estimation hypothesis corresponding to the second phase estimation (phi2) at 1408. For example, a short hopping distance has less ambiguity and, therefore, may be used to help solve ambiguity corresponding to a longer hopping distance.

After selecting an estimation hypothesis at 1408, the eNB may update the first phase estimation at 1410 based on the selected estimation hypothesis.

Additional aspects for the receiver described in connection with FIGS. 4-11 may also be performed in the method of FIG. 14.

Figure 15:
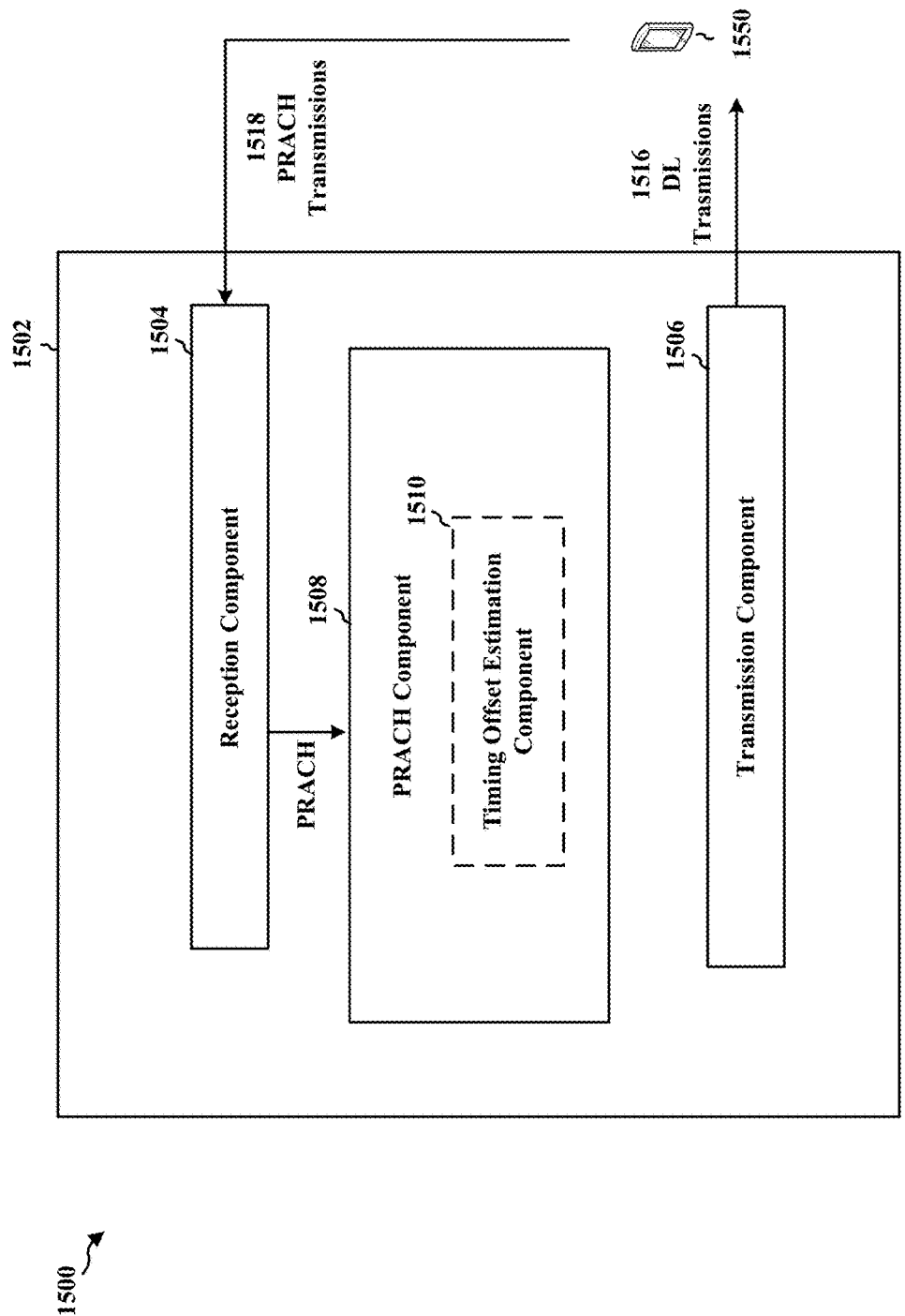
FIG. 15 is a conceptual data flow diagram illustrating the data flow between different means/components in an exemplary apparatus.

FIG. 15 is a conceptual data flow diagram 1500 illustrating the data flow between different means/components in an exemplary apparatus 1502. The apparatus may be a receiver, such as eNB 102, 310, 802, 1250. The apparatus includes a reception component 1504 that receives UL communication 1518 from UE 1550, e.g., including a first set of tones of a PRACH at a first tone hopping distance and a second set of tones of a PRACH at a second tone hopping distance. The apparatus includes a transmission component 1506 that transmits DL communication 1516 to the UE 1550. The apparatus includes a PRACH component 1508 having a timing offset estimation component 1510 that determines a first set of phase estimations (phi1) based on the first set of tones and a second set of phase estimations (phi2) based on the second set of tones, as described in connection with FIG. 14.

The apparatus may include additional components that perform each of the blocks of the algorithm in the aforementioned flowcharts of FIG. 14, and aspects described in connection with FIGS. 4-10. As such, each block in the aforementioned flowcharts of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
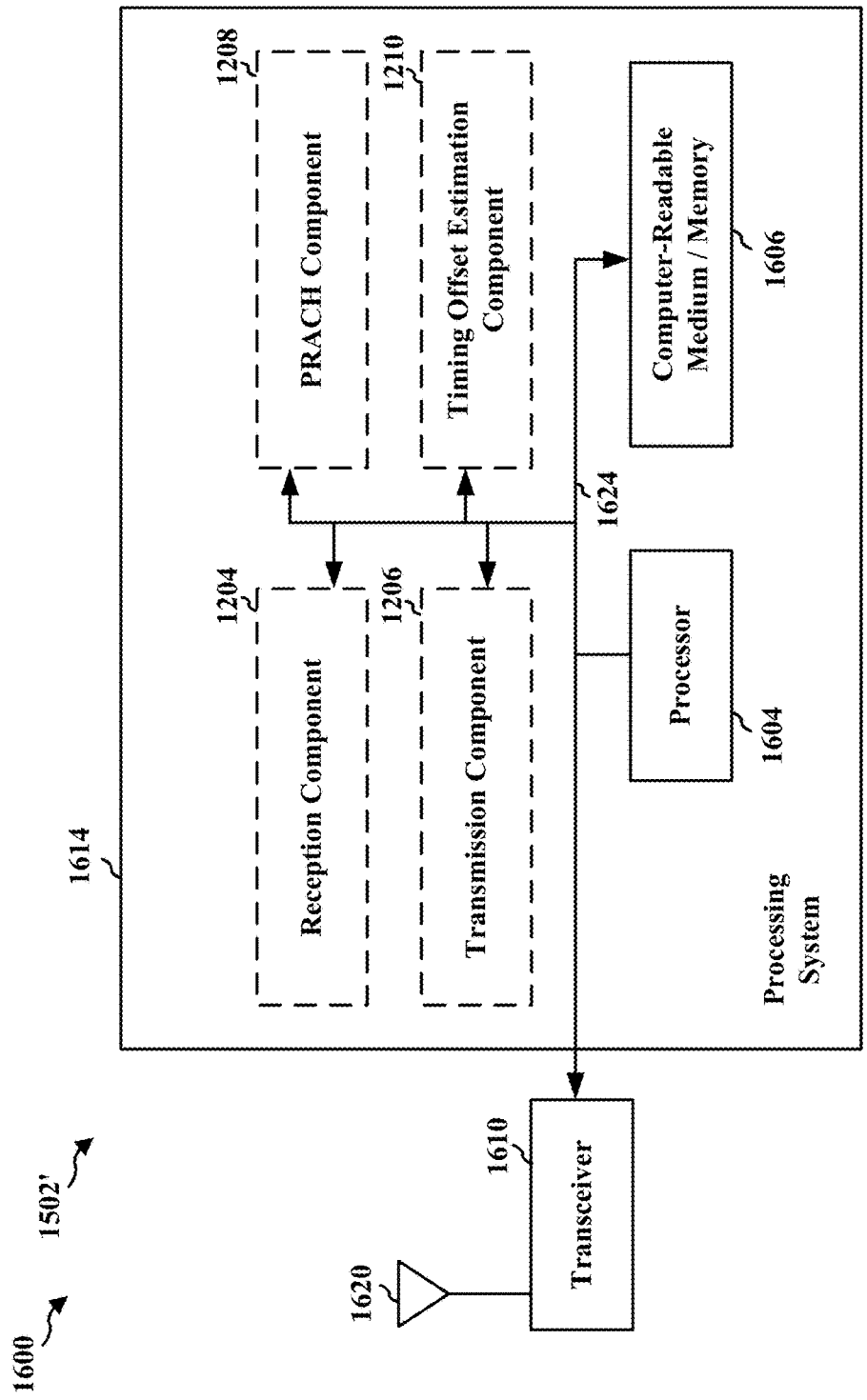
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1604, the components 1504, 1506, 1508, 1510, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1504. In addition, the transceiver 1610 receives information from the processing system 1614, specifically the transmission component 1506, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system 1614 further includes at least one of the components 1504, 1506, 1508, 1510. The components may be software components running in the processor 1604, resident/stored in the computer readable medium/memory 1606, one or more hardware components coupled to the processor 1604, or some combination thereof. The processing system 1614 may be a component of the eNB 310 and may include the memory 376 and/or at least one of the TX processor 316, the RX processor 370, and the controller/processor 375

In one configuration, the apparatus for wireless communication may include any of means for receiving a first set of tones of a PRACH at a first tone hopping distance and receiving a second set of tones of a PRACH at a second tone hopping distance, means for determining a first set of phase estimations based on the first set of tones and a second set of phase estimations based on the second set of tones, means for using the first phase estimation to select an estimation hypothesis corresponding to the second phase estimation, and means for updating the first phase estimation based on the selected estimation hypothesis.

The aforementioned means may be one or more of the aforementioned components of the apparatus and/or a processing system, e.g., including at least one processor, of the apparatus configured to perform the functions recited by the aforementioned means. As described supra, the processing system may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
    transmitting a first symbol on a first tone of a Physical Random Access Channel (PRACH);
    transmitting a second symbol on a second tone of the PRACH at a first hopping distance from the first tone;
    transmitting a third symbol on a third tone of the PRACH; and
    transmitting a fourth symbol on a fourth tone of the PRACH at a second hopping distance from the third tone.

2. The method of claim 1, wherein the wireless communication comprises a narrow band wireless communication.

3. The method of claim 1, wherein the second hopping distance is greater than first hopping distance.

4. The method of claim 1, wherein the second hopping distance corresponds to the first hopping distance multiplied by an integer greater than 1.

5. The method of claim 1, wherein a third hopping distance between the first symbol on the first tone and third symbol on the third tone corresponds to a random hopping distance.

6. The method of claim 1, wherein a third hopping distance between the fourth symbol on the fourth tone and the first symbol on the first tone corresponds to a random hopping distance.

7. The method of claim 1, further comprising:
    transmitting an additional symbol on an additional tone of the PRACH using a third hopping distance that is a random hopping distance.

8. The method of claim 1, further comprising:
    determining a coverage enhancement (CE) level;
    selecting the first hopping distance between tone transmissions of the PRACH based on the CE level, wherein a first distance is selected as the first hopping distance when the CE level is below a reference level and a second distance is selected as the first hopping distance when the CE level is above the reference level, and
    wherein the first distance is greater than the second distance.

9. The method of claim 1, further comprising:
    receiving a resource allocation information mapping tones in a transmission resource to a coverage enhancement (CE) level, and wherein the first symbol on the first tone, the second symbol on the second tone, the third symbol on the third tone and the fourth symbol on the fourth tone are transmitted within a transmission resource indicated by the resource allocation information.

10. The method of claim 9, wherein the CE level maps to tones in a fixed transmission resource, and wherein the first symbol on the first tone, the second symbol on the second tone, the third symbol on the third tone and the fourth symbol on the fourth tone are transmitted within the fixed transmission resource.

11. The method of claim 9, wherein the CE level maps to tones in a plurality of fixed transmission resources, the method further comprising:
    receiving resource allocation information corresponding to the CE level, wherein the first symbol on the first tone, the second symbol on the second tone, the third symbol on the third tone and the fourth symbol on the fourth tone are transmitted within one of the plurality of fixed transmission resources indicated by the resource allocation information.

12. The method of claim 1, further comprising:
    determining a coverage enhancement (CE) level, wherein a first CE level is associated with a different timing advance granularity for tone transmissions of the PRACH than a second CE level.

13. The method of claim 1, wherein spacing between tones for the PRACH is different than spacing between tones for a corresponding uplink or downlink data transmission.

14. An apparatus for wireless communication at a user equipment, comprising:
    means for receiving downlink communication from a base station; and
    means for transmitting a first symbol on a first tone of a Physical Random Access Channel (PRACH) to the base station,
    wherein the means for transmitting transmits a second symbol on a second tone of the PRACH at a first hopping distance from the first tone, transmits a third symbol on a third tone of the PRACH, and transmits a fourth symbol on a fourth tone of the PRACH at a second hopping distance from the third tone.

15. The apparatus of claim 14, wherein the wireless communication comprises a narrow band wireless communication, and wherein the second hopping distance is greater than first hopping distance.

16. The apparatus of claim 14, wherein the second hopping distance corresponds to the first hopping distance multiplied by an integer greater than 1.

17. The apparatus of claim 14, wherein a third hopping distance between the first symbol on the first tone and the third symbol on the third tone corresponds to a random hopping distance or a fourth hopping distance between the fourth symbol on the fourth tone and the first symbol on the first tone corresponds to a random hopping distance.

18. The apparatus of claim 14, wherein the means for transmitting transmit an additional symbol on an additional tone of the PRACH using a third hopping distance that is a random hopping distance.

19. The apparatus of claim 14, further comprising:
means for determining a coverage enhancement (CE) level;
means for selecting the first hopping distance between tone transmissions of the PRACH based on the CE level, wherein a first distance is selected as the first hopping distance when the CE level is below a reference level and a second distance is selected as the first hopping distance when the CE level is above the reference level, and
wherein the first distance is greater than the second distance.

20. The apparatus of claim 14, wherein the means for receiving are configured to receive a resource allocation information mapping tones in a transmission resource to a coverage enhancement (CE) level, and wherein the first symbol on the first tone, the second symbol on the second tone, the third symbol on the third tone and the fourth symbol on the fourth tone are transmitted within a transmission resource indicated by the resource allocation information, and
wherein the CE level maps to at least one of:
tones in a fixed transmission resource, and wherein the first symbol on the first tone, the second symbol on the second tone, the third symbol on the third tone and the fourth symbol on the fourth tone are transmitted within the fixed transmission resource, or
tones in a plurality of fixed transmission resources, wherein the means for receiving receive resource allocation information corresponding to the CE level, wherein the first symbol on the first tone, the second symbol on the second tone, the third symbol on the third tone and the fourth symbol on the fourth tone are transmitted within one of the plurality of fixed transmission resources indicated by the resource allocation information.

21. The apparatus of claim 14, further comprising:
means for determining a coverage enhancement (CE) level, wherein a first CE level is associated with a different timing advance granularity for tone transmissions of the PRACH than a second CE level.

22. The apparatus of claim 14, wherein spacing between tones for the PRACH is different than spacing between tones for a corresponding uplink or downlink data transmission, and wherein at least the first tone is mapped to a position for a corresponding uplink data transmission or downlink data transmission following a successful PRACH transmission.

23. An apparatus for wireless communication, comprising:
a memory; and
at least one processor coupled to the memory and configured to:
transmit a first symbol on a first tone of a Physical Random Access Channel (PRACH);
transmit a second symbol on a second tone of the PRACH at a first hopping distance from the first tone;
transmit a third symbol on a third tone of the PRACH; and
transmit a fourth symbol on a fourth tone of the PRACH at a second hopping distance from the third tone.

24. The apparatus of claim 23, wherein the wireless communication comprises a narrow band wireless communication, and wherein the second hopping distance is greater than first hopping distance.

25. The apparatus of claim 23, wherein the second hopping distance corresponds to the first hopping distance multiplied by an integer greater than 1.

26. The apparatus of claim 23, wherein a third hopping distance between the first symbol on the first tone and the third symbol on the third tone corresponds to a random hopping distance or a fourth hopping distance between the fourth symbol on the fourth tone and the first symbol on the first tone corresponds to a random hopping distance.

27. The apparatus of claim 23, wherein the at least one processor is further configured to:
transmit an additional symbol on an additional tone of the PRACH using a third hopping distance that is a random hopping distance.

28. The apparatus of claim 23, wherein the at least one processor is further configured to:
determine a coverage enhancement (CE) level; and
select the first hopping distance between tone transmissions of the PRACH based on the CE level, wherein a first distance is selected as the first hopping distance when the CE level is below a reference level and a second distance is selected as the first hopping distance when the CE level is above the reference level, and
wherein the first distance is greater than the second distance.

29. The apparatus of claim 23, wherein the at least one processor is further configured to:
receive a resource allocation information mapping tones in a transmission resource to a coverage enhancement (CE) level, and wherein the first symbol on the first tone, the second symbol on the second tone, the third symbol on the third tone and the fourth symbol on the fourth tone are transmitted within a transmission resource indicated by the resource allocation information, wherein the CE level maps to at least one of:
tones in a fixed transmission resource, and wherein the first symbol on the first tone, the second symbol on the second tone, the third symbol on the third tone and the fourth symbol on the fourth tone are transmitted within the fixed transmission resource, or
tones in a plurality of fixed transmission resources, wherein the at least one processor is further configured to receive resource allocation information corresponding to the CE level, wherein the first symbol on the first tone, the second symbol on the second tone, the third symbol on the third tone and the fourth symbol on the fourth tone are transmitted within one of the plurality of fixed transmission resources indicated by the resource allocation information.

30. The apparatus of claim 23, wherein the at least one processor is further configured to:
determine a coverage enhancement (CE) level, wherein a first CE level is associated with a different timing advance granularity for tone transmissions of the PRACH than a second CE level.

31. The apparatus of claim 23, wherein spacing between tones for the PRACH is different than spacing between tones for a corresponding uplink or downlink data transmission, and wherein at least the first tone is mapped to a position for a corresponding uplink data transmission or downlink data transmission following a successful PRACH transmission.

32. A non-transitory computer-readable medium storing computer executable code for execution by at least one processor, wherein the computer executable code is for wireless communication, comprising code to:
 transmit a first symbol on a first tone of a Physical Random Access Channel (PRACH);
 transmit a second symbol on a second tone of the PRACH at a first hopping distance from the first tone;
 transmit a third symbol on a third tone of the PRACH; and
 transmit fourth symbol on a fourth tone of the PRACH at a second hopping distance from the third tone.

33. The non-transitory computer-readable medium of claim 32, wherein the wireless communication comprises a narrow band wireless communication, and wherein the second hopping distance is greater than first hopping distance.

34. The non-transitory computer-readable medium of claim 32, wherein the second hopping distance corresponds to the first hopping distance multiplied by an integer greater than 1.

35. The computer-readable medium of claim 32, a third hopping distance between the first symbol on the first tone and the third symbol on the third tone corresponds to a random hopping distance or a fourth hopping distance between the fourth symbol on the fourth tone and the first symbol on the first tone corresponds to a random hopping distance.

36. The non-transitory computer-readable medium of claim 32, further comprising code to:
 transmit an additional symbol on an additional tone of the PRACH using a third hopping distance that is a random hopping distance.

37. The non-transitory computer-readable medium of claim 32, further comprising code to:
 determine a coverage enhancement (CE) level; and
 select the first hopping distance between tone transmissions of the PRACH based on the CE level, wherein a first distance is selected as the first hopping distance when the CE level is below a reference level and a second distance is selected as the first hopping distance when the CE level is above the reference level, and
 wherein the first distance is greater than the second distance.

38. The non-transitory computer-readable medium of claim 32, further comprising code to:
 receive a resource allocation information mapping tones in a transmission resource to a coverage enhancement (CE) level, and wherein the first symbol on the first tone, the second symbol on the second tone, the third symbol on the third tone and the fourth symbol on the fourth tone are transmitted within a transmission resource indicated by the resource allocation information, wherein the CE level maps to at least one of:
 tones in a fixed transmission resource, and wherein the first symbol on the first tone, the second symbol on the second tone, the third symbol on the third tone and the fourth symbol on the fourth tone are transmitted within the fixed transmission resource, or
 tones in a plurality of fixed transmission resources, further comprising code to:
 receive resource allocation information corresponding to the CE level, wherein the first symbol on the first tone, the second symbol on the second tone, the third symbol on the third tone and the fourth symbol on the fourth tone are transmitted within one of the plurality of fixed transmission resources indicated by the resource allocation information.

39. The non-transitory computer-readable medium of claim 32, further comprising code to:
 determine a coverage enhancement (CE) level, wherein a first CE level is associated with a different timing advance granularity for tone transmissions of the PRACH than a second CE level.

40. The non-transitory computer-readable medium of claim 32, wherein spacing between tones for the PRACH is different than spacing between tones for a corresponding uplink or downlink data transmission, and wherein at least the first tone is mapped to a position for a corresponding uplink data transmission or downlink data transmission following a successful PRACH transmission.

* * * * *